United States Patent
Fantone

[11] Patent Number: 6,101,334
[45] Date of Patent: Aug. 8, 2000

[54] DUAL FOCAL LENGTH CAMERA

[75] Inventor: Stephen D. Fantone, Lynnfield, Mass.

[73] Assignee: Mobi Corporation, Lynnfield, Mass.

[21] Appl. No.: 09/314,787

[22] Filed: May 19, 1999

Related U.S. Application Data

[60] Division of application No. 08/815,594, Mar. 12, 1997, Pat. No. 5,960,218, which is a continuation-in-part of application No. 08/800,572, Feb. 18, 1997, abandoned.

[51] Int. Cl.$^7$ ............................. G03B 15/00; G03B 17/00
[52] U.S. Cl. ............................................... 396/72; 396/352
[58] Field of Search ................................ 396/72, 73, 351, 396/352

[56] References Cited

U.S. PATENT DOCUMENTS

| | | | |
|---|---|---|---|
| 3,791,274 | 2/1974 | Hansen | 396/351 |
| 4,527,874 | 7/1985 | Ohmura | 396/73 |
| 4,589,748 | 5/1986 | Ohmura | 396/72 |
| 4,609,270 | 9/1986 | Kohno et al. | 396/74 |
| 4,655,571 | 4/1987 | Ohmura et al. | 396/72 |
| 4,758,852 | 7/1988 | Maejima | 396/6 |
| 4,772,903 | 9/1988 | Labaziewicz | 396/351 |
| 4,801,958 | 1/1989 | Stoneham | 396/73 |
| 4,812,863 | 3/1989 | Ohmura | 396/375 |
| 4,812,866 | 3/1989 | Ushiro et al. | 396/6 |
| 4,833,495 | 5/1989 | Ohmura et al. | 396/387 |
| 4,840,466 | 6/1989 | Yamada et al. | 396/351 |
| 5,313,239 | 5/1994 | Mizukawa | 396/471 |
| 5,473,473 | 12/1995 | Estelle et al. | 359/691 |
| 5,502,525 | 3/1996 | Mizoguchi | 396/450 |
| 5,576,782 | 11/1996 | Kamegana et al. | 396/6 |
| 5,721,973 | 2/1998 | Mizukawa | 396/73 |

FOREIGN PATENT DOCUMENTS

WO 95/30918  11/1995  WIPO .

*Primary Examiner*—W. B. Perkey
*Attorney, Agent, or Firm*—Francis J. Caufield

[57] ABSTRACT

Compact dual focal length cameras are disclosed having wide angle and telephoto modes of operation. The ratio of telephoto to wide angle ratios is at least 3 to 1, but is typically higher so that the cameras can be used in conjunction with binoculars to take telephoto pictures that give the same visual appearance as when the same scenes are observed through binoculars. Compactness and increased focal length are achieved via four mirror arrangements one preferred embodiment of which wraps around the camera film plane and uses a single constant angular velocity shutter for providing both wide angle and telephoto exposure times. Compact, single-use, medium telephoto cameras are also disclosed.

5 Claims, 13 Drawing Sheets

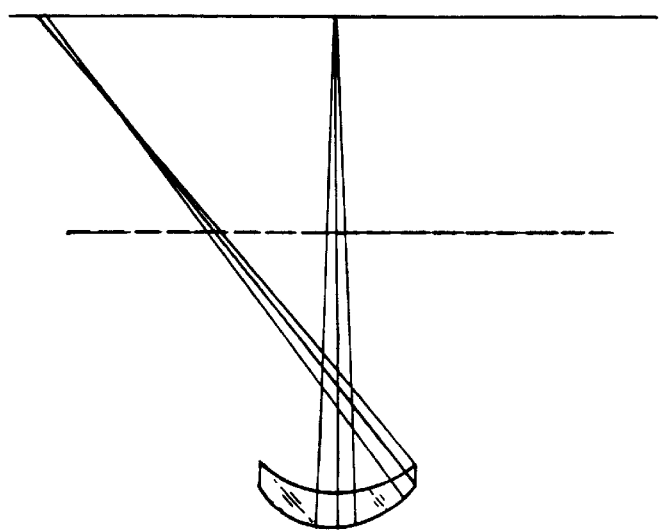
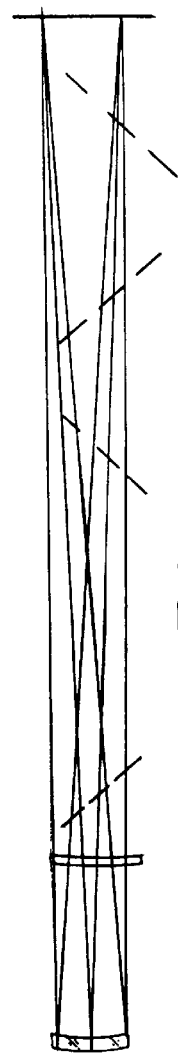

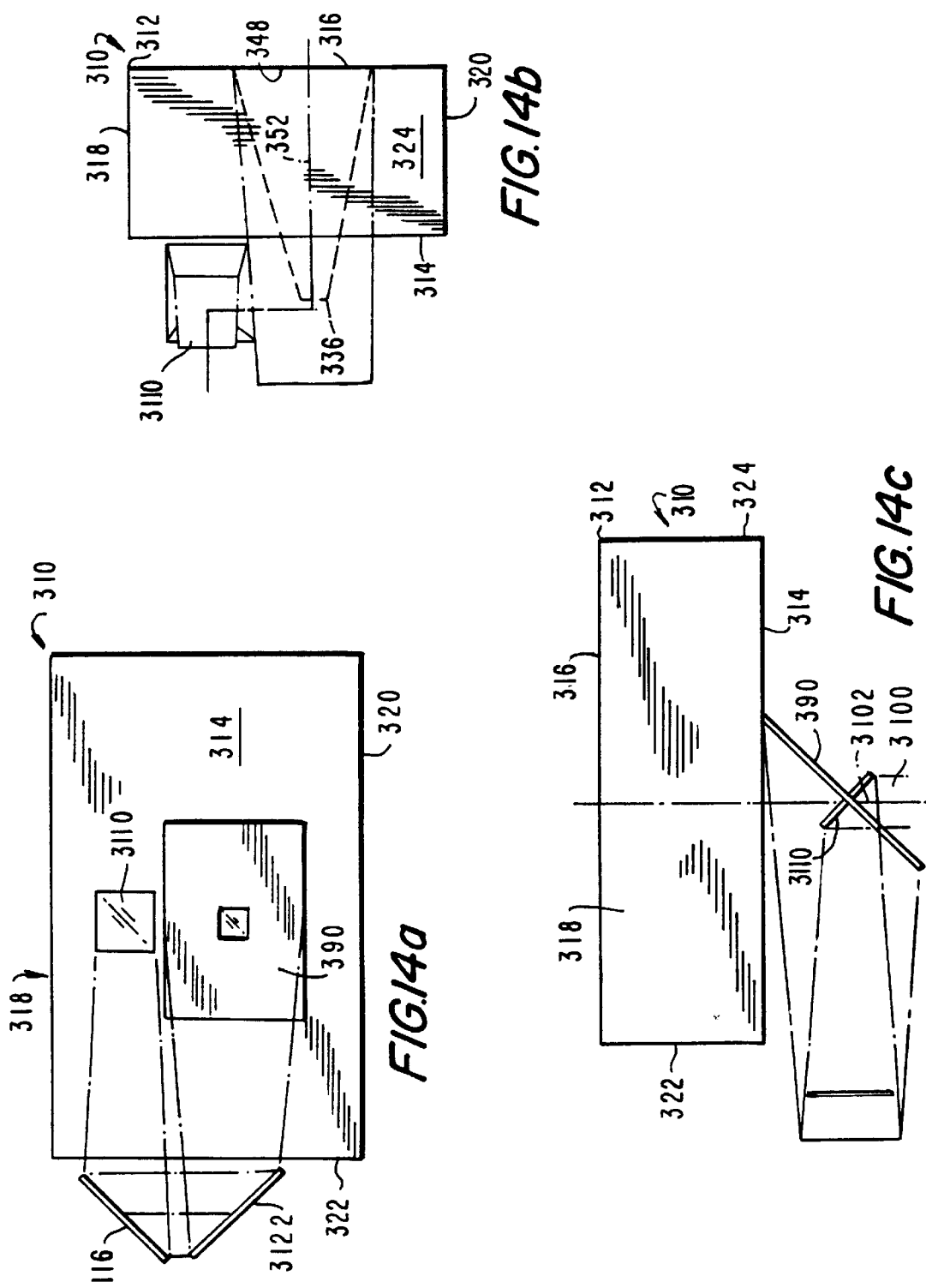

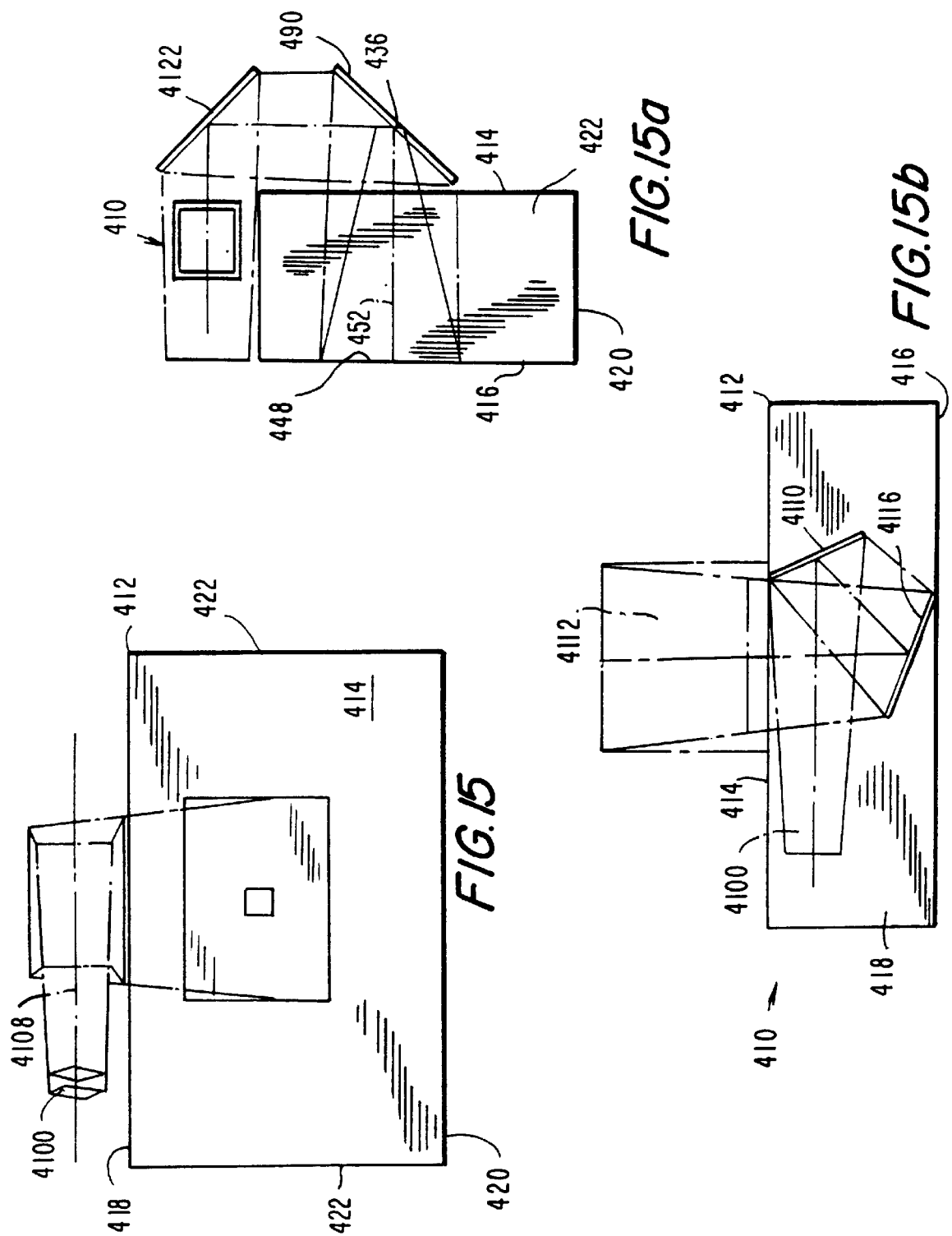

DUAL FOCAL LENGTH CAMERA

CROSS-REFERENCE TO RELATED APPLICATION

This application is a divisional of U.S. patent application Ser. No. 08/815,594 filed on Mar. 12, 1997 now U.S. Pat. No. 5,960,218, which, in turn, is a continuation-in-part of U.S. patent application Ser. No. 08/800,572, filed on Feb. 18, 1997 now abandoned.

BACKGROUND OF THE INVENTION

1. Field of the Invention

This invention generally relates to low-cost, compact, photographic cameras and, more particularly, to special purpose, compact, dual focal length cameras operable in a wide angle mode for taking wider field of view photographs than normal and a telephoto mode for taking close-up photographs that have the appearance of distant scenes as observed through binoculars having a magnification in the range including 5×–8×.

2. Description of the Prior Art

In the last few years, a significant market has developed for simple, low-cost 35 mm cameras of the "point and shoot" type. These cameras are available in both the conventional multiple-use configuration, which is adapted to have the end-user load and replace the film supply, and a single-use format which comes pre-loaded with film and is intended to be sent back to a factory for film processing.

Such single-use 35 mm cameras have become extremely popular because they are perceived as a convenient, low-cost alternative to conventional cameras with replaceable film capability. The single-use cameras typically come with a single lens having a focal length that provides a slightly wider angular view than is considered normal for 35 mm film (usually with a lens having a focal length approximately equal to the film diagonal to about 50 mm). Telephoto and panoramic versions of the single-use camera also are available. For prior art examples of such wide angle, telephoto and panoramic single-use cameras, reference is directed to U.S. Pat. No. 5,576,782 issued on Nov. 19, 1996 and entitled "LENS-FITTED PHOTO FILM UNIT FOR USE WITH TAKING LENSES OF DIFFERENT FOCAL LENGTH".

Also known in the prior art are single-use, dual focal length cameras having two taking lenses, each having a different focal length. Usually, these cameras include a wide angle lens for taking wide angle photographs and a telephoto lens for taking close up photographs of distant scenes. The wide angle lens typically has a focal length in the range of 30–40 mm, and the telephoto lens typically is in the short telephoto range of 70–90 mm, thus providing a modest telephoto to wide angle focal length ratio of about 2:1, or at best 3:1.

The wide angle lens is generally mounted on the front of camera forward of an unfolded, relatively short, direct optical path from the lens to the film plane, which is located at the back of the camera. Because the imaging optical path for the telephoto lens is approximately two to three times longer than that of the wide angle lens, and it is desirable to keep the size of the camera housing relatively compact, these cameras generally use two internal mirrors (usually one mirror is moveable) to define a compact, folded optical path between the telephoto lens and the film plane.

For examples of such dual focal length cameras, reference is directed to: U.S. Pat. Nos. 4,609,270 issued Sep. 2, 1986 and entitled "CAMERA WITH INTERCHANGEABLE TAKING LENSES; 4,772,903 issued Sep. 20, 1988 and entitled "DUAL LENS CAMERA"; and 4,989,026 issued Jan. 29, 1991 and entitled "BIFOCAL CAMERA".

While these dual focal length cameras perform very well when operated in the telephoto mode for taking photographs of scenes or subjects at moderate distances, photographs taken of far away subjects, such as athletes at sporting events or performers at entertainment events, are very disappointing because the subjects of principal interest are relatively small in the photograph and still appear to be very distant.

To obtain a close-up view of distant subjects at such events, people will often use a pair of binoculars providing image magnification in the range of 5×–8×. However, when they take a photograph of the same scene using the dual focal length camera's 70–90 mm telephoto lens, the resultant photographic image of the scene is only about one-half to one-third the size of the image provided by the binoculars.

This invention is intended to fulfill an identifiable need for a compact, low-cost, dual focal length camera to be used in conjunction with binoculars of modest power at sporting, entertainment, or other events for taking close up photographs that have the appearance of distant scenes as observed through binoculars having a magnification in the range including 5×–8×.

In binocular jargon, one often refers to the the width of the field covered at a distance of 1000 yards, and this ususally corresponds to the diameter of a circle since most binoculars have circular fields of view. To achieve field coverage comparable to 5×–8× binoculars at 1000 yards requires a telephoto lens whose focal length is approximately between 140 to 240 mm, which is substantially longer than the typical telephoto lens provided in such dual focal length cameras.

However, a dual focal length 35 mm camera incorporating a telephoto lens in the 140–240 mm focal length lens range would require an unacceptably large and ergonomically undesirable camera, even if one adopts the above noted prior art practice of using two internal mirrors to define a folded optical path between the telephoto lens and the camera's film plane.

Therefore, it is a principal object of this invention to provide a compact, dual focal lens camera which is operable in a telephoto mode to take close-up photographs that have the appearance of distant scenes as observed through binoculars having a magnification in the range including 5×–8×.

Another object of this invention is to provide such a camera in which the telephoto optical system for taking such close-up photographs in configured in ways that fit into a compact camera housing that is ergonomically desirable and is only slightly larger than the housing used in conventional dual focal camera.

Yet another object of this invention is to provide such a camera that is inexpensive to manufacture thereby making it economically feasible to market the camera in a single-use camera configuration.

Another object of this invention is provide a compact, low-cost, dual focal length camera that is specially designed to be a complementary companion product for use in conjunction with a pair of low cost binoculars, such as those disclosed in U.S. patent application Ser. No. 08/320,920 filed on Oct. 11, 1994 and entitled "Low-Cost, Light-Weight, Compact Binoculars".

Another object of the invention is to provide a compact, dual focal length optical system that is capable of imaging onto a photodetector in telephoto and wide angle modes of operation.

Another object of the invention is to provide compact, single-use cameras with medium telephoto lenses.

Other objects of the invention will in part be obvious and will in part appear hereinafter. A full understanding of the invention will best be had from reading the detailed description to follow in connection with the detailed drawings.

SUMMARY OF THE INVENTION

The present invention accomplishes the above noted objectives by providing a novel, compact, dual focal length camera operable in a wide angle mode for taking wide angle photographs and a telephoto mode for taking close up photographs that have the appearance of distant scenes as observed through binoculars having a magnification in the range including 5×–8×.

This inventive camera includes a compact housing, means for defining a film plane within the housing and wide angle and telephoto lens systems.

The wide angle lens system functions to form a wide angle image of a scene at the film plane and includes a wide angle lens, having a given focal length, for directing imaging bearing light along a first optical path to the film plane for use in the wide angle mode of operation.

The telephoto lens system functions to form a magnified image of a scene at the film plane and includes a telephoto lens, having a focal length that is at least three times longer than the given focal length of the wide angle lens.

The camera also includes four mirrors for providing a folded optical path between the telephoto lens system and the film plane.

At least one of the four mirrors is mounted for movement between a first position in which it permits scene light emerging from the wide angle lens system to impinge on the film plane while preventing scene light from emerging from the telephoto lens system from impinging on the film plane and a second position in which it prevents scene light emerging from the wide angle optical system from impinging on the film plane while directing scene light emerging from the telephoto optical system onto the film plane.

The camera is adapted to be switched between wide angle and telephoto modes of operation by having the camera operator actuate means for moving the moveable mirror between its the first and second positions.

In one preferred embodiment, the four mirrors actually wrap around the film plane to provide compact and ergonomically sound design that is also aesthetically pleasing. Other preferred embodiments have all four mirrors located forward of the film plane, all to one side of it.

A number of lens designs are provided to demonstrate the range of optical designs that may be combined to achieve the desired telephoto to wide angle ratios while still remaining compact. Compact, single-use, medium telephoto cameras are also disclosed.

DESCRIPTION OF THE DRAWINGS

The structure and operation of the invention, together with the other objects and advantages thereof, may best be understood by reading the detailed description in connection with the drawings wherein the same parts appearing in different drawings have the same reference number and wherein:

FIG. 6 is a lens construction diagram showing a 41.5 mm wide angle lens in its unfolded configuration;

FIG. 7 is a lens construction diagram showing a 140 mm telephoto lens in its unfolded configuration;

FIG. 14a is a diagrammatic front-elevational view of the camera shown in FIG. 14;

FIG. 14b is a diagrammatic side-elevational view of the camera shown in FIG. 14;

FIG. 14c is a diagrammatic top-elevational view of the camera shown in FIG. 14;

FIG. 15 is a diagrammatic front-elevational view of a third alternative preferred embodiment of the inventive, compact, dual focal length camera showing selected components of its wide angle and telephoto optical systems;

FIG. 15a is a diagrammatic side-elevational view of the camera shown in FIG. 15;

FIG. 15b is a diagrammatic top-elevational view of the camera shown in FIG. 15.

DETAILED DESCRIPTION

Figure 1:
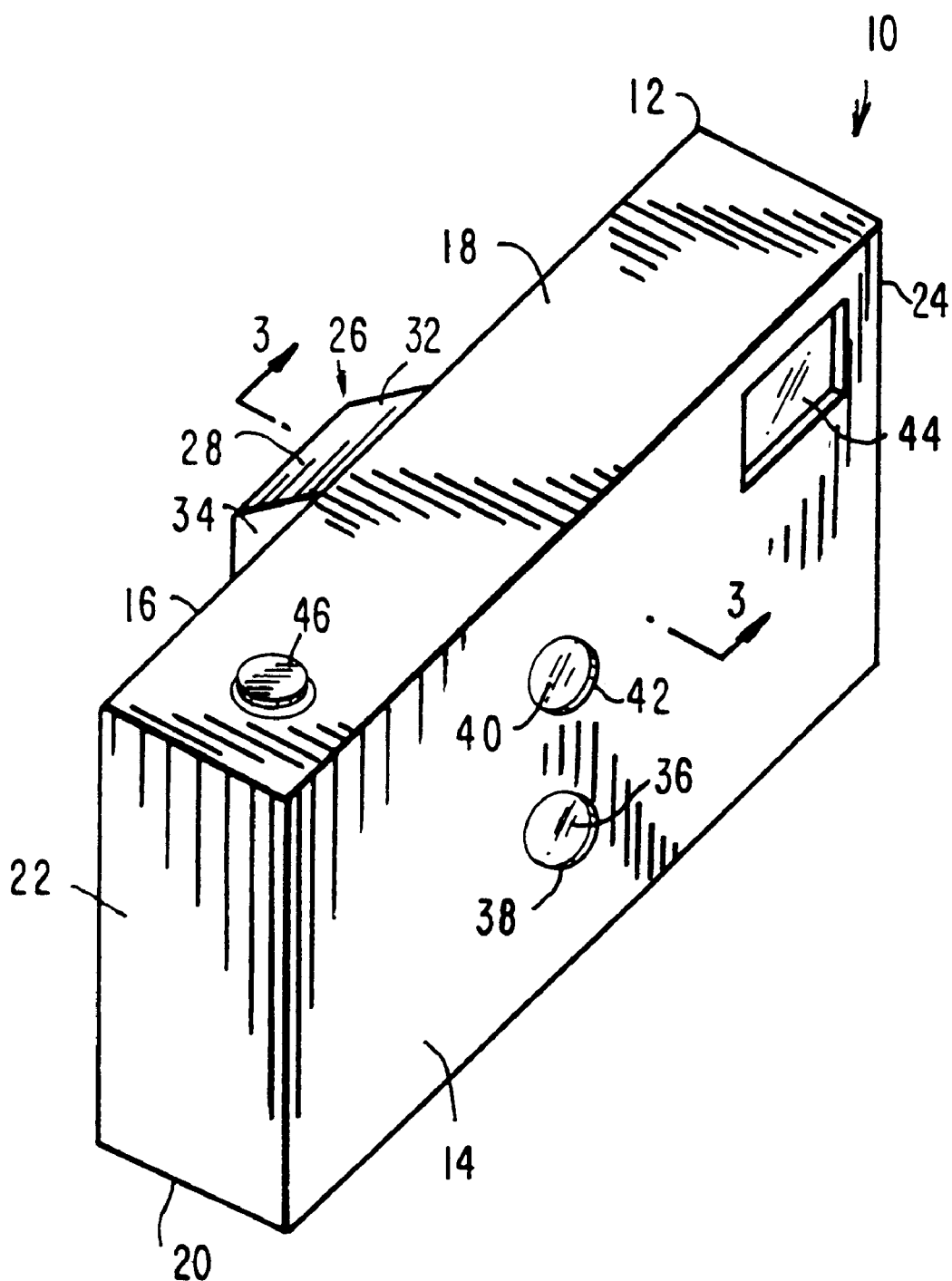
FIG. 1 is a diagrammatic front perspective view of a preferred embodiment of the inventive compact, dual focal length camera.
Figure 2:
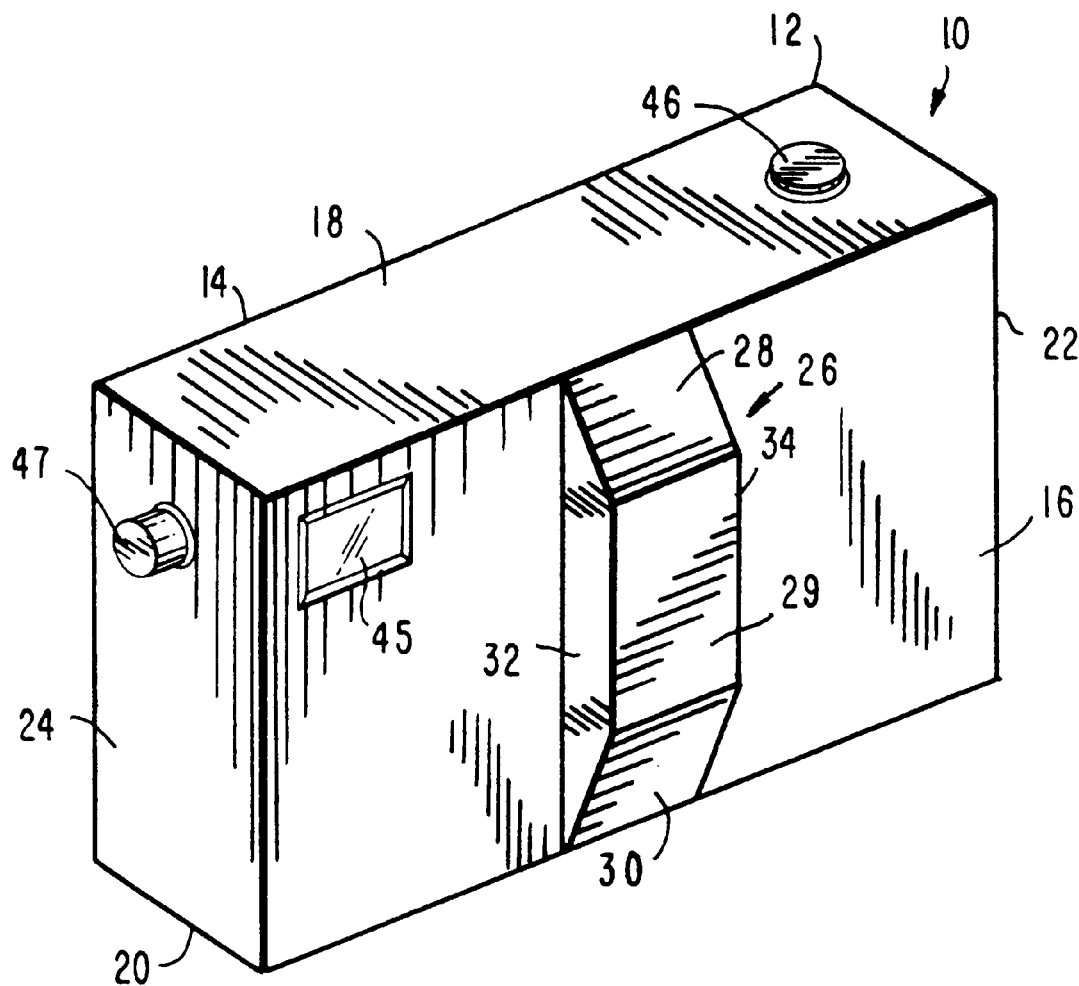
FIG. 2 is a diagrammatic rear perspective view of the camera shown in FIG. 1.

FIG. 1 shows a first preferred embodiment of a compact, dual focal camera 10 of the present invention. Camera 10 includes a compact camera housing 12 formed by a forward wall 14, an opposite rear wall 16, a top wall 18, an opposite bottom wall 20, and opposed side walls 22 and 24. Integrally formed with rear wall 16 and centrally disposed thereon is a rearwardly extending housing section 26, as best shown in FIG. 2, for supporting a pair of internal mirrors and for enclosing a segment of a telephoto optical path defined in part by the mirrors as will become apparent later. Section 26 has a generally trapezoidal, readwardly extending vertical cross section and is formed by inclined rear wall sections 28, 29 and 30 and opposed side wall sections wall sections 32 and 34.

Camera 10 is of the dual focal length type that employs two separate optical image forming systems for taking pictures on the same film format but having different angular perspectives and image magnification defined by the focal length, film format, and lens design used in each of the two optical system.

As will become apparent, camera 10 has a primary or first optical system having a relatively short focal length for taking pictures that fall within a range classified by those having ordinary skill in the art as "normal" (or "standard") to "very wide angle" and an auxiliary or second optical system having a relatively longer focal length for taking pictures that fall within a range of image formats classified by those having ordinary skill in the art as "medium telephoto". As will be discussed in detail later, the medium telephoto range has been chosen for the auxiliary optical system to provide camera 10 with the capability of taking close-up photographs that have the appearance of distant scenes as observed through binoculars having a magnification in the range including, but not necessarily limited to, 5x–8x.

Where camera 10 is configured to use conventional 35 mm photographic film (24 mm×36 mm image area), the primary optical system would typically have a focal length somewhere between 50 mm for the normal or standard format and 28 mm for a very wide angle format. The corresponding medium telephoto or second optical system would typically have a focal length in the range of 120 mm–240 mm.

With reference to FIG. 1, the illustrated camera 10 includes a lens 36, aligned with a first lens opening 38 in housing forward wall 14, that forms part of the shorter focal length primary optical imaging system and a lens 40, aligned with a second lens opening 42 in forward wall 14 above opening 38, that forms part of the longer focal length auxiliary optical system.

Camera 10 also includes a conventional direct viewfinder preferably having a forward lens element 44 which is shown at the right upper end of forward housing wall 14, as viewed in FIG. 1, and an aligned rear lens element 45 shown in the upper left end of rear wall 16 as viewed in FIG. 2. These two lens elements, 44 and 45, are preferably in the form of a well-known reversed Galilean telescope, but may also take the form of simpler direct viewfinders. In either case, appropriate masks are to be used with the viewfinder to provide correct framing corresponding to the wide angle and telephoto modes of operation. Mounted on top wall 18 is a conventional shutter actuation button 46.

As best shown in FIG. 2 camera 10 also has rotatable knob 47 mounted on housing side wall 24, which is actuable by the camera operator to move a later to be described mirror between a first or wide angle exposure position and a second or telephoto exposure position.

Camera 10 is designed to be a simply constructed, low-cost, single-use, dual focal length camera of the "point and shoot" type. The term "single-use" as used herein means that the camera comes from the factory pre-loaded with a single roll of film that is not directly accessible to, nor is it intended to be handled or replaced by, the end user. After all of the frames in the roll of film have been exposed, the entire camera is sent back to a factory, or an independent film processor, where the film is removed and processed. However, it should be clearly understood that the present invention is not limited for use only in single-use cameras but may also be used in more conventional cameras that are designed to have the film loaded and replaced by the end user.

Figure 3:
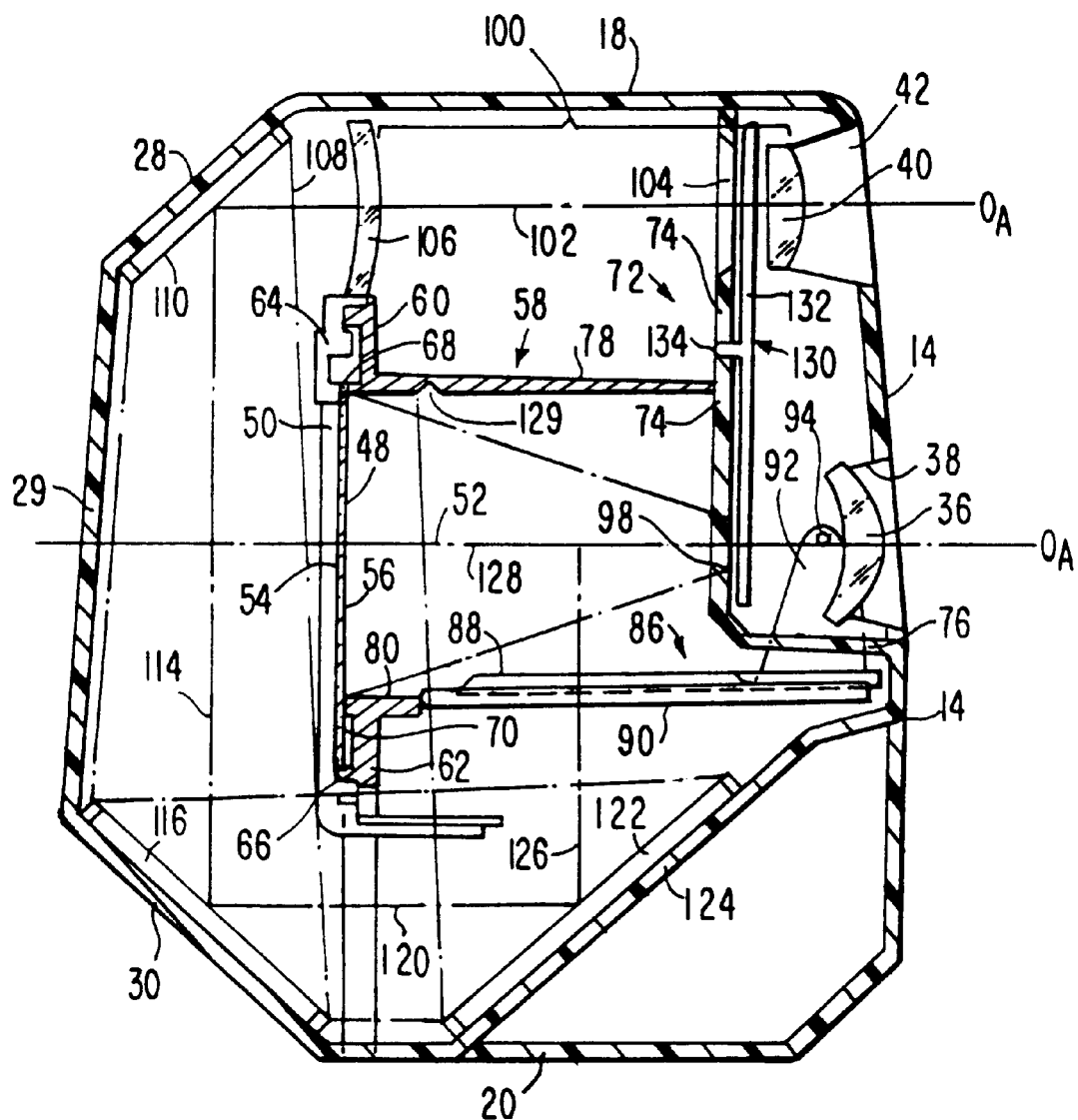
FIG. 3 is a diagrammatic vertical section of the camera shown in FIG. 1, taken along line 3—3, showing a movable mirror assembly in a first position for taking wide-angle photographs.
Figure 4:
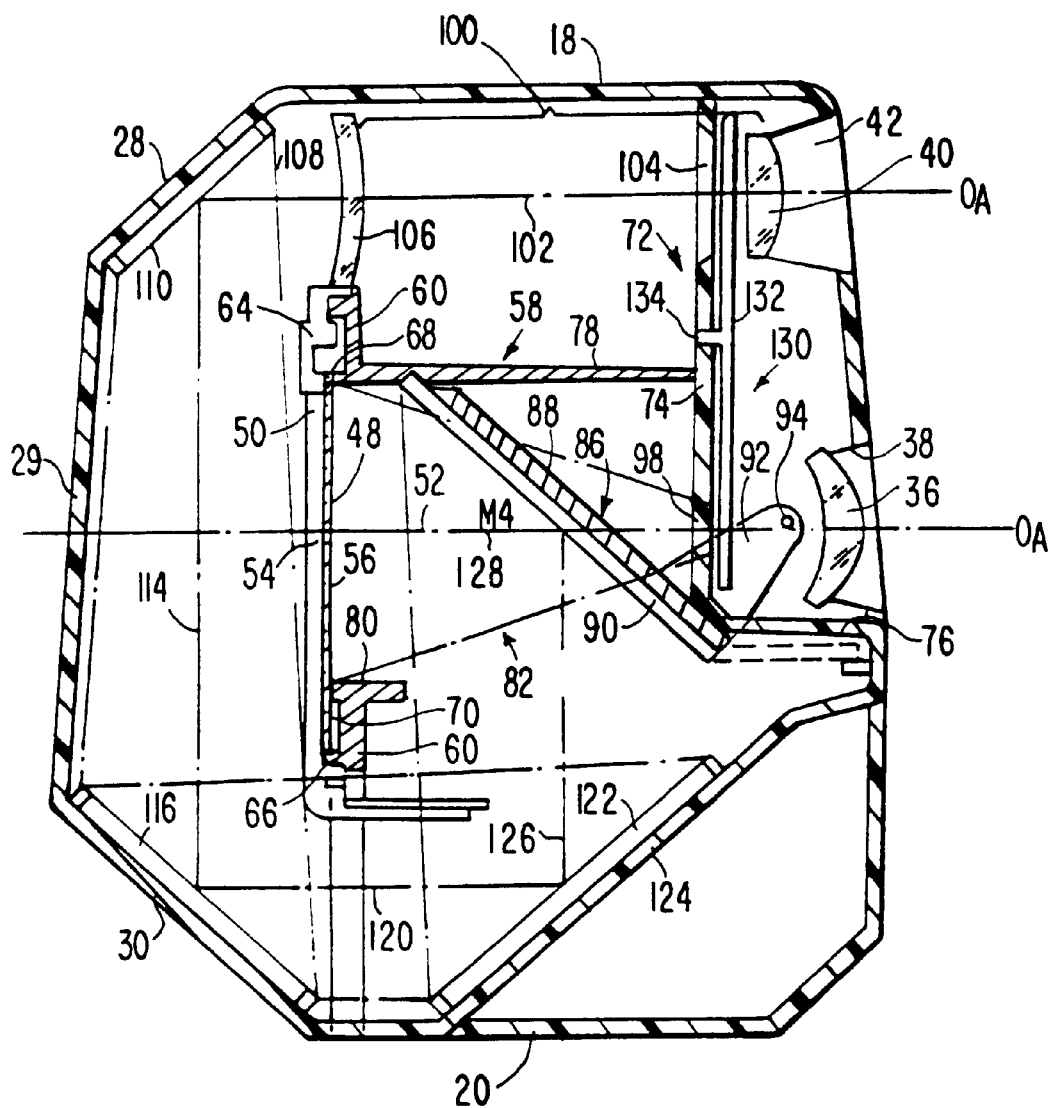
FIG. 4 is a diagrammatic vertical section similar to that shown in FIG. 3 except that the moveable mirror is shown in its second position for taking telephoto photographs.

With reference to FIG. 3 and FIG. 4, the longer focal length auxiliary or medium telephoto second optical system is operatively accommodated within the relatively small and compact camera housing 12 by using an arrangement of four (4) mirrors to provide a four segment folded optical path including a telephoto lens system, formed in part by lens 40, and the camera's internal film exposure plane 48 which is common to both the primary and auxiliary optical systems.

This particular preferred embodiment of camera 10 is characterized by the telephoto system folded optical path which has a portion thereof that wraps around behind film plane 48. As will become apparent later, other preferred embodiments of camera 10 will include folded telephoto optical that have all portions thereof located in front of the film plane 48.

As shown in FIG. 3 and FIG. 4, camera 10 includes a vertically disposed internal, film plane defining, film strip support plate member 50 which extends laterally between the side walls 22 and 24 of the housing 12 and is spaced forwardly from rear housing wall 16 and the mirror housing section 26 thereon in orthogonal or normal relation to the horizontal optical axis 52 of the primary taking lens 36 that is mounted in a conventional lens mount (not shown) just behind housing forward wall 14 in alignment with lens opening 38.

The support plate member 50 is preferably a molded plastic part that includes a forward facing vertical surface 54 against which a portion of a film strip 56, between supply and take-up rolls (not shown), bears to locate that portion of the film 56 at the film exposure or object plane 48. Coupled to and extending forwardly of film support member 50 is light blocking tube or baffle assembly 58, to be described in detail later, that surrounds the rear portion of the image bearing light path from lens 36 to exposure plane 48 to block unwanted stray light that may enter housing 12 from reaching and exposing that portion of the film 56 at the exposure position. Baffle assembly 58 includes upper and lower flange portions 60 and 62, respectively, which snap into complementary flange portions 64 and 66 of member 50 to form upper and lower, laterally extending guided channels 68 and 70 for receiving the upper and lower edges of the film strip 56 to maintain it in bearing relation against the forward surface 54 of member 50 to locate that portion of the film 56 in the exposure position at the camera's film plane 48.

By accurately locating forward film bearing surface 54 of film support member 50 with respect to the primary and auxiliary optical systems, surface 54 serves as the means for defining the camera's film plane 48.

Positioned behind camera housing forward wall 14 in covering relation to the both the primary lens 36 and auxiliary lens 40 is a an "L" shaped lens aperture defining and shutter mounting member 72 having a vertically disposed section 74, having its upper end attached to the inside of housing top wall 18, and a horizontally disposed section 76 having its forward end attached to the inside of housing forward wall 14 below the lower lens opening 38.

As viewed in the vertical cross sections of FIG. 3 and FIG. 4, the light baffle assembly 58 includes an upper portion 78 which extends forwardly from flange 60 and has its forward end attached to the back side of the vertical section 74 of member 72 and a lower portion 80 that extends forwardly and has its forward end attached to the inside of housing wall 14 just below section 76 of member 72. Lower portion 80 of baffle 58 includes a telephoto light path opening 82 therein (best shown in FIG. 4) which is adapted to be selectively blocked by a moveable mirror assembly 86 located it its first position when camera 10 is configured in its wide angle mode of operation as shown in FIG. 3, and second position when mirror assembly 86 is moved to its unblocking configuration shown in FIG. 4 to configure camera 10 for telephoto operation.

Assembly 86 comprises a mirror support plate 88, having a mirror 90 attached to the underside thereof, and an upstanding flange 92 formed at the forward end of plate 88 having its upper end fixedly attached to a laterally extending, horizontal shaft 94 which is mounted in housing end wall 24 for rotational movement about the axis of shaft 94. This shaft 94 extends through wall 24 where it is attached to the knob 47 that is adapted to be rotated by the user to pivotally move assembly 86 and the mirror 90 thereon between the first and second position. Thus, the mirror support 88 plate, in combination with flange 92, shaft 94 and the knob 47 at the distal end thereof constitute means, actuable by the camera operator, for moving moveable mirror 90 between its said first and second positions.

As noted earlier, dual focal length camera 10 includes a primary optical system having a relatively short focal length for taking normal to wide-angle format photographs and an auxiliary or telephoto optical system for taking close-up photographs having the appearance of distant scenes as observed through binoculars having a magnification in the range including 5×–8×.

In this illustrated preferred embodiment of camera 10, the primary optical system includes a primary lens system in the form of the single or singlet taking lens 36 and a corresponding aperture opening 98 formed in lower portion of lens aperture defining member 72 so that aperture opening 98 is in alignment with the optical axis 52 of lens 36. With the mirror 90 in its first or horizontal position, shown in FIG. 3, where it blocks opening 82 and does not intrude into the optical imaging path of taking lens 36, the camera is configured for its wide angle mode of operation wherein lens 36 and its corresponding aperture opening 98 provide a focused image of a scene at the film plane 48.

The illustrated auxiliary or telephoto optical system includes a two-element medium telephoto lens system 100 comprising: the first or front lens element 40, aligned with opening 42 in wall 14 and mounted so its optical axis 102 is substantially parallel to the optical axis 52 of lens 36 and is orthogonal or normal to the camera's film plan 48; a corresponding aperture opening 104 formed in the upper portion of the lens aperture defining member 72 so that aperture opening 104 is aligned with the optic axis 102 of lens 40; and a second or rear lens element 106 fixedly mounted between the top of film support member 50 and the underside of housing wall 18 behind aperture defining member 72 such that it is in alignment with aperture opening 104 and its optical axis 108 coincides with the optical axis 102 of the front lens element 40.

Compared with lens 36, the medium telephoto lens 100 has a relatively long focal length requiring a relatively longer optical path to the film exposure plane 48. As a basis for comparison, the term short telephoto lens (typically a portrait lens) as used herein refers to lenses having a focal length in the range of 70 mm–105 mm, and the term medium telephoto lens as used herein refers to lenses having a focal length in the range of 120 mm–240 mm for 35 mm formatted film. It should be noted that invention can be practiced with film formats other than 35 mm, and these formats include the most recent APS format. In addition, it will be appreciated that the invention can be used with non-film photodetectors such as digital imaging arrays as, for example, CCD arrays.

As noted earlier, dual focal length cameras known in the prior art typically use a short telephoto lens for the auxiliary optical systems. In order to accommodate the longer optical path of the short telephoto lens (relative to the shorter focal length wide angle or normal lens) and yet maintain a compact camera configuration, such cameras employ a pair of mirrors to fold the optical path between the short telephoto lens system and the film plane into a space saving Z-folded configuration.

However, using the same two mirror, Z-fold approach when the auxiliary optical systems employs a longer focal length medium telephoto lens would substantially and undesirably increase the dimensions of the camera housing thereby losing its compact characteristic.

The term "compact' as applied to photographic cameras is a relative term because the size of the film used therein will dictate certain minimum camera dimensions relating to the optical path lengths required to provide the proper size image for that film format.

While the inventive aspects of camera 10 are not limited to configurations designed for conventional 35 mm film, examples of the specific lenses and optical paths will be given for cameras that are adapted to use 35 mm film because it is by far the most common size film used today. Therefore, the term "compact" when used herein for cameras embodying the present invention that are designed for 35 mm film will mean cameras having only slightly larger overall size compared to popular 35 mm point and shoot, dual focal length cameras (single and multiple use) that are commercially available at this time while retaining desirable ergonomic features, convenience of use and are easy to carry.

To retain compactness while accommodating the longer exposure paths length required by the medium telephoto lens 100, camera 10 employs a four mirror system to fold the relatively long optical path between the medium telephoto lens 100 and the film plane 48. As best shown in FIG. 3 and FIG. 4, this four mirror system includes a first mirror 110, fixedly mounted on inclined housing wall section 28 behind lens element 106 and the film plane 48 in alignment with and at a 45° angle to the optical axis 108 of lens 106 for folding the image bearing light optical path downwardly, at an angle of 90° with respect to optical axis 106 along a principal optical path segment 114 behind the film plane 48 to a second mirror 116. Mirror 116 is fixedly mounted on inclined housing wall section 30 at a 45° angle to optical path segment 114 to fold or bend the optical path through 90° along principal segment 120 forwardly and past the film plane 48 to a third mirror 122.

Mirror 122 is fixedly mounted on a fixed internal mirror support member 124, extending between housing walls 14 and 20, to locate mirror 122 at a 45° angle with respect to optical path segment 120 thereby reflecting image bearing light upwardly and folding the optical path through 90° with respect to path segment 120, along optical path segment 126. Thus, the four mirrors 90, 110, 116, and 122 reside in planes each of which is perpendicular to a plane containing the optical axes of the wide angle singlet taking lens 36 and the telephoto lens systems 100.

For the telephoto mode of operation, the camera operator has turned the knob 47 to pivot and locate the moveable mirror 90 in its raised telephoto or second position, best shown in solid lines in FIG. 4, unblocking opening 82 in the baffle member 58 and wherein its reflective surface is at a 45° angle to the optical path segment 126 and the film plane 48 to bend or fold the optical path rearwardly through 90°, with respect to path segment 126, along path segment 128 to focus image bearing light on the film 56 at the exposure plane 48. This last optical path segment 128 coincides with the rearward portion of the optical path between lens 36 and the film plane when the camera is operated in the wide angle mode employing the primary optical system. When moveable mirror assembly 86, and mirror 90 thereon, are in the raised telephoto position of FIG. 4, the trailing edge of mirror 90 fits into an edge receiving notch 129 in upper baffle member 78 forming a light seal between the raise mirror 90 which extends across the interior of baffle 58 in light blocking relationship thereto where it prevents scene light emerging from the wide angle lens system from impinging on the film plane while directing scene light emerging from the telephoto lens system onto the film plane.

For wide angle operation, the camera operator turns the knob 47 to pivot the moveable mirror assembly downwardly to the position shown in FIG. 3 wherein mirror 90 is in covering, light blocking relation to the opening 82 in the baffle member 58 wherein mirror 90 permits scene light emerging from the wide angle lens system to impinge on the film plane 48 while preventing light emerging from the telephoto lens system and attempting to pass through opening 82 from impinging upon the film plane 48.

To manage image bearing light transmission within camera housing 12 for film exposure purposes, camera 10 preferably uses a single shutter mechanism 130, for both the wide angle and telephoto taking optical paths, in combination with moveable mirror assembly 86 and the mirror 90 thereon.

Figure 5:
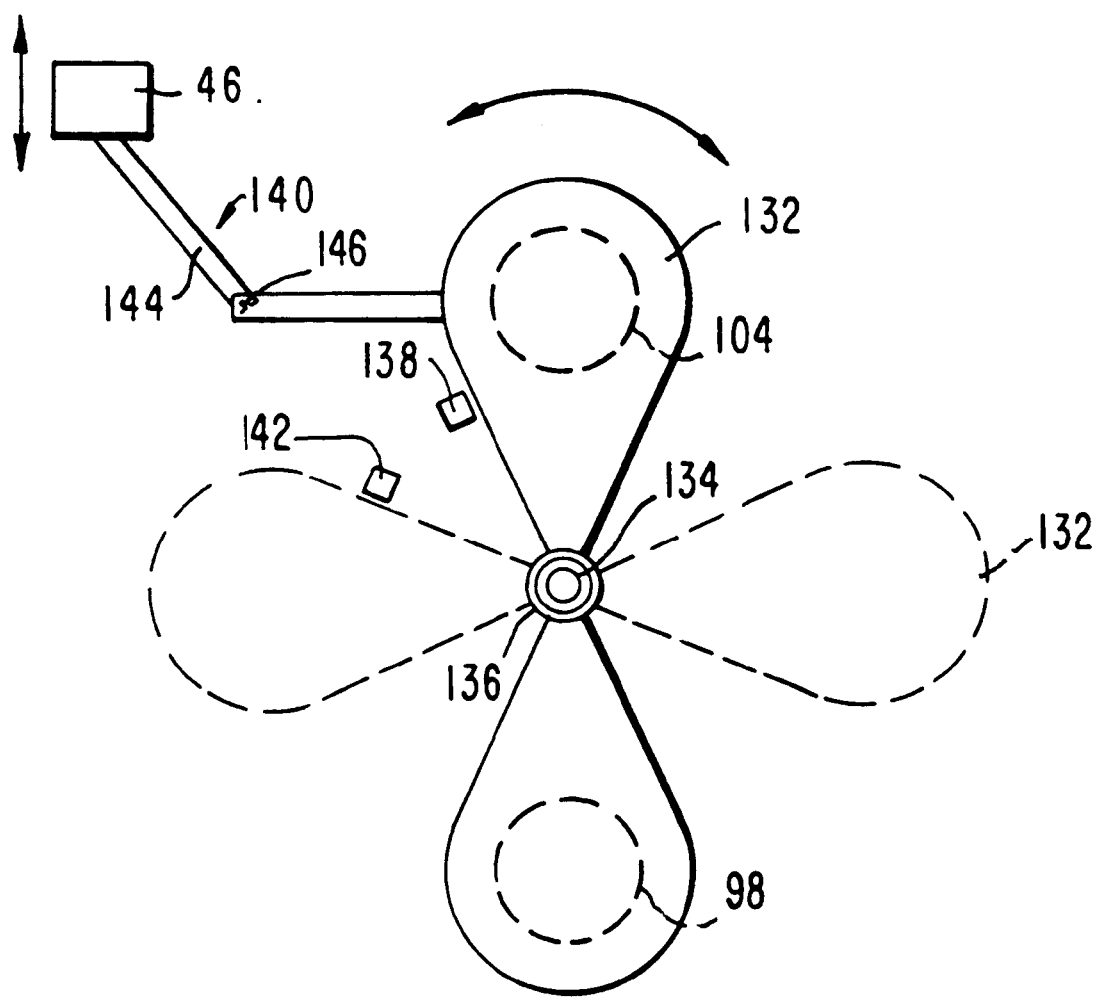
FIG. 5 is a diagrammatic front elevational view of a bow tie shaped camera shutter shown in its normal light blocking position in solid lines and its light unblocking film exposure position in dotted lines.

With reference to FIGS. 3, 4 and 5, shutter mechanism 130 includes a light opaque bow tie shaped shutter blade 132 which includes a centrally disposed rearwardly extending fixed shaft 134 which is mounted in a bearing in member 72 for rotation about the axis of shaft 134 between it light blocking normal position shown in solid lines in FIG. 5 wherein it covers aperture openings 98 and 104 in section 74 of member 72 and blocks transmission of image bearing light therethrough and a film exposure position, show in dotted lines in FIG. 5, where shutter blade 132 has been pivoted about shaft 134 so it is in unblocking relation to aperture openings 98 and 104 to permit transmission of image bearing light therethrough towards and along the previously noted optical paths of the first and second optical systems. With this single shutter design, the wide angle aperture 98 and the telephoto aperture 104 are simultaneously unblocked during both the wide angle and telephoto modes of operation when blade 132 moves to its unblocking position, allowing image bearing light from both lens systems to enter camera housing 12. At noted earlier, the moveable mirror 90 on mirror assembly 86 is moved between its first and second positions to create the necessary light seals to prevent unwanted light allowed to enter the camera housing by the shutter mechanism 130 from impinging upon the film.

The illustrated single shutter mechanism 130 is designed to have shutter blade 132 rotate at fixed angular velocity between its light blocking and unblocking positions. As will become apparent, the design of the wide angle and telephoto lenses can be optimized for use with the single shutter mechanism 130 having a fixed angular velocity so that both the wide angle and telephoto taking paths can be used to deliver substantially the same exposure for a given film speed.

As shown in FIG. 5, the shutter mechanism 130 further includes a spring 136 coiled around shaft 134 having one end fixed to blade 132 and its opposite end mechanically grounded on or fixed to member 74 so as to impart a normal counter-clockwise rotation bias and urge the trailing edge of the upper blade portion against a fixed stop 138 mounted on member 74 to locate blade 132 in its normal light blocking position shown in solid lines.

Shutter mechanism 130 further includes means, in the form of a diagrammatically illustrated blade striker mechanism 140, for striking the trailing edge of the upper portion of blade 132 with a known constant force to cause blade 132 to rotate in the clockwise direction about the axis of shaft 134, against the counter-clockwise bias of spring 136, at a fixed angular velocity from the blocking position to the unblocking position. Blade 132 continues to rotate in the clockwise direction until the leading edge of its lower blade portion engages a resilient stop 142 fixedly mounted on member 74. Stop 142 is formed of a resilient material such as rubber or the like, and serves as a resiliently deformable bumper for bouncing the blade 132 back in the opposite direction with a given constant force so that blade 132 then rotates in the clockwise direction at the fixed angular velocity to its closed position where the force of spring 136 holds blade 132 against stop 138.

The illustrated striker mechanism 140 include a V-shaped arm 144 that is pivotally mounted at 146 on member 74. The upper end of arm 144 is connected to shutter action button 46 and the opposite end of arm 144 is positioned against the trailing edge of blade 132 above stop 138. When the camera operator depresses button 46, this action pivots arm 144 about pivot 146 in a counter-clockwise direction and the opposite end of arm 144 strikes blade 132 with a predetermined given force to rotate the blade 132 in the clockwise direction at the fixed angular velocity. Although not shown in the drawing, the arm 144 is spring biased to return to its normal position following the depression of button 46.

A variety of simple, low-cost constant or fixed angular velocity shutter mechanisms are well-known in the photographic arts and may be used in camera 10, in place of the illustrated shutter mechanism 130, to provide such a fixed angular velocity shutter.

With moveable mirror 90 in its wide angle mode position of FIG. 3 blocking opening 82, camera 10 is ready to take a wide angle picture. Upon actuation of the shutter 130, both the wide angle and telephoto apertures 98 and 104 are unblocked and light emerging from the wide angle lens system impinges upon the film plane 48 to expose a frame 56 of the film while the mirror 90 blocks light emerging from the telephoto lens system from impinging on the film plane 48 and interfering with the exposure of the film.

With the moveable mirror 90 in its raised telephoto mode operative position blocking or light sealing the forward end of baffle 58 in communication with the wide angle aperture 98 while unblocking baffle opening 82 and positioning mirror 90 to direct light emerging from the telephoto lens system, camera 10 is ready to take a telephoto picture. Upon actuation of shutter mechanism 130, both the wide angle and telephoto apertures 98 and 104 are unblocked and light emerging from the wide angle lens system impinges upon the back side of raised mirror 90 and is blocked or prevented from impinging upon the film plane 48 while the forward side of the mirror 90 directs light emerging from the telephoto lens system to the film plane 48 to expose of the film.

Thus, camera 10 has four mirrors for providing a folded optical path between the telephoto lens system and the film plane, at least one of the four mirrors being mounted for movement between a first position in which it permits scene emerging from the wide angle lens system to impinge on the film plane while preventing scene light from emerging from the telephoto lens system from impinging on the film plane and a second position in which it prevents scene light emerging from the wide angle optical system from impinging on the film plane while directing scene light emerging from the telephoto optical system onto the film plane.

Of importance in the operation of camera 10 are other factors including exposure times, depth of field, f/number of the lens and the motion stopping capability of the shutter.

Experiments have indicated that the medium telephoto lens 100 would require a shutter speed of 1/150th of a second or faster to prevent objectionable motion blurring. However, the shorter primary taking lens 36 can utilize a much longer exposure, e.g., in the range of 1/40th of a second, because the shorter focal length produces motion blurring in proportion to the focal length of the lens.

To provide for a reasonable depth of field, the f/number of the longer focal length medium telephoto lens 100 must be relatively high, typically on the order of 16–20.

To illustrate how various system parameters impact the determination of the optical systems of camera 10, it will be assumed, for the moment, that the primary lens 36 has a baseline focal length of 40 mm and the medium telephoto lens 100 has a baseline focal length of 160 mm. These focal length values along with illustrative values for other optical system parameters are shown in the following Table A.

TABLE A

SYSTEM PARAMETERS

|  | WIDE ANGLE | TELPHOTO |
|---|---|---|
| Focal Length Range (mm) | 32–40 | 140–200 |
| Baseline Focal Length (mm) | 40 | 160 |
| Shutter Speed (sec) | 1/40 th | 1/160 th |
| f/(number | 40 | 20 |
| Aperture Stop (approximate) | 1 mm | 8 mm |

By operating the two optical systems in this manner, the faster shutter speed for the medium telephoto lens 100 is compensated for by the decreased f/number (larger aperture).

In approaching the system design in this way, the mechanical design of the shutter presents a substantial challenge. In comparison with the shutter speed for the wide angle lens 36, the shutter for the telephoto lens 100 must open and close an aperture that is eight (8) times the diameter of the wide angle lens aperture in one fourth (¼) the time. With linear velocity, this is a factor of thirty two (32) in shutter blade speed.

Another design approach is to operate the wide angle optics at a faster f/number (for example, F/13). This requires a larger lens opening (for example, a 3 mm aperture stop) and a shutter which operates nine (9) times faster (1/360 second). In this case, the linear velocity of the shutter blades for both wide angle and telephoto lenses is equal as shown in the following calculation.

As is well known in the art, shutter blade velocity is proportional to aperture stop diameter divided by exposure time.

TABLE B

Shutter Blade Velocity Calculation

| Lens | Aperture Stop | Exposure Time | Calculation |
|---|---|---|---|
| Wide Angle | 3 mm | 1/360 sec | 3 mm/(1/360 sec) = 1080 mm/sec |
| Telephoto | 8 mm | 1/160 sec | 8 mm//(1/160 sec) = 1080 mm/sec |

As those skilled in the art will appreciate, by optimizing the design of the two optical systems so that each system uses the same shutter blade angular velocity, the design of the shutter may be substantially simplified thereby allowing the use in camera 10 of a low-cost common shutter that operates at a single fixed angular velocity with only a difference in aperture diameter between the wide angle and telephoto optical systems. It will also be evident that the radial distance from the shutter pivot point to the respective apertures can be adjusted as an additional parameter available as a means of controlling shutter speed with the constant angular velocity shutter preferably used here. For consistency in the various examples to follow, it shall be assumed the speed of the film to be used with these optical systems is in the range of ASA 700–1600.

Two preferred lens designs that have been optimized for use with a single shutter mechanism having a fixed angular velocity so that both the wide angle and telephoto taking paths can be used to deliver substantially the same exposure for a given film speed are presented in Tables 1 and 2 which follow.

Table 1 presents the constructional data and design parameters for a wide angle singlet, meniscus in form, that has an effective focal length of 41.5 mm and an f/number= 14.25. The constructional data of Table 1, where the data is in millimeters, should be used in reference to FIG. 6, which shows the wide angle lens in its unfolded configuration with surfaces 2 and 3 corresponding to of the singlet's front and rear surfaces. Surfaces beyond 2 and 3 in the constructional data are mirror locations as will be understood by those skilled in the art. Surface 2 here is aspheric and is in accordance with the aspheric coefficients that appear in Table 1. The aspheric coefficients are based on the well-known aspheric equation for the SAG at a surface, i.e., the departure of the surface from its apical radius, and is given by:

$$SAG = \frac{C\rho^2}{1 + \sqrt{1 - (CC+1)C^2\rho^2}} + AD\rho^4 + AE\rho^6 + \ldots$$

C=CURVATURE  CC=CONIC CONSTANT $$\rho = \sqrt{X^2 + Y^2}$$

TABLE 1

WIDE ANGLE 41.5 MM EFL, f/14.25 LENS

| Surface | Radius | Thickness | Medium | Index |
|---|---|---|---|---|
| 0 | .00000000 | 1.82880000E + 04 | AIR | |
| 1 | 6.83978409 | 2.50000000 | ACRYLIC | 1.491757 |
| 2 | 9.04711519 | 7.09541261 | AIR | |
| 3 | .00000000 | 1.00000000 | AIR | |
| 4 | .00000000 | 0.00000000 | AIR | |
| 5 | .00000000 | 11.92592461 | AIR | |

TABLE 1-continued

WIDE ANGLE 41.5 MM EFL, f/14.25 LENS

| Surface | Radius | Thickness | Medium | Index |
|---|---|---|---|---|
| 6 | .00000000 | −.00244186 | AIR | |
| 7 | .00000000 | 16.600000000 | AIR | |
| 8 | .00000000 | .000000000 | AIR | |

ASPHERIC SURFACE COEFFICIENTS

| SURFACE 2 | COEFFICIENT | |
|---|---|---|
| | CC | −8.39863E − 01 |
| | AD | 2.97237E − 04 |
| | AE | 3.93371E − 06 |
| | AF | .0000000E + 00 |
| | AG | .0000000E + 00 |

LENS PARAMETERS

| EFL = | 41.5098 | F/NBR = | 14.25 |
|---|---|---|---|
| BF = | 16.6000 | LENGTH = | 22.5213 |
| OID = | 18327.1189 | T-MAG = | −.002275 |

The telephoto design whose constructional data appears in Table 2 is a two-element lens made of acrylic with one aspheric surface. It appears in FIG. 7 where it is shown in its unfolded configuration, and has an effective focal length of 140 mm with an f/number=13.96. Here, again surfaces beyond surface 7 are mirror locations. The telephoto to wide angle ratio of focal lengths of the lenses of Tables 1 and 2 is 140/41.5 or 3.37.

TABLE 2

TELEPHOTO 140 MM EFL, f/13.96 LENS

| Surface | Radius | Thickness | Medium | Index |
|---|---|---|---|---|
| 0 | .00000000 | 1.82880000E + 04 | AIR | |
| 1 | 82.96647746 | 2.50000000 | ACRYLIC | 1.49175 |
| 2 | 100.98642275 | .00000000 | AIR | |
| 3 | .00000000 | 2.00000000 | AIR | |
| 4 | .00000000 | 0.00000000 | AIR | |
| 5 | .00000000 | 25.4000000 | AIR | |
| 6 | 47.68758142 | 0.6000000 | ACRYLIC | 1.49175 |
| 7 | 120.13184415 | 9.70000000 | AIR | |
| 8 | .00000000 | .000000000 | AIR | |
| 9 | .00000000 | 54.2000000 | AIR | |
| 10 | .00000000 | .00000000 | AIR | |
| 11 | .00000000 | 26.000000 | AIR | |
| 12 | .00000000 | .00000000 | AIR | |
| 13 | .00000000 | 28.200000 | AIR | |
| 14 | .00000000 | .00000000 | AIR | |
| 15 | .00000000 | 16.600000 | AIR | |
| 16 | .00000000 | .00000000 | AIR | |

ASPHERIC SURFACE COEFFICIENTS

| SURFACE 6 | CC | −3.22917E + 00 |
|---|---|---|

LENS PARAMETERS

| EFL = | 140.3967 | F/NBR = | 13.96 |
|---|---|---|---|
| BF = | 16.6 | LENGTH = | 149.6 |
| OID = | 18454.2 | T-MAG = | −.007726 |

Figure 8:
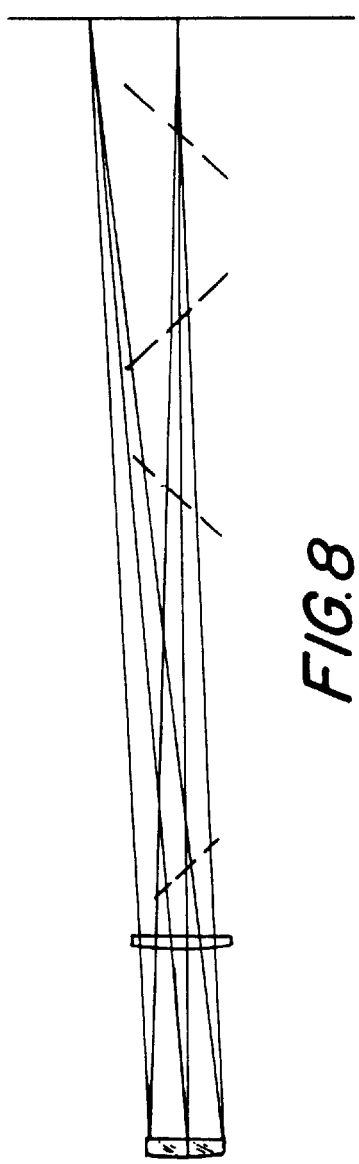
FIG. 8 is a lens construction diagram showing a 166 mm telephoto lens in its unfolded configuration.

Table 3 represents yet another telephoto lens design. This lens, which is shown unfolded in FIG. 8, is also of all acrylic design. It has an effective focal length of 166 mm and a f/number of 16.37. Surface 6 is aspheric and is the first surface of the last element.

TABLE 3

TELEPHOTO 166 MM EFL, f/16.6 LENS

| Surface | Radius | Thickness | Medium | Index |
|---|---|---|---|---|
| 0 | .00000000 | 1.82880000E + 04 | AIR | |
| 1 | 56.71365418 | 2.50000000 | ACRYLIC | 1.49175 |
| 2 | 191.86832977 | .00000000 | AIR | |
| 3 | .00000000 | 2.00000000 | AIR | |
| 4 | .00000000 | 0.00000000 | AIR | |
| 5 | .00000000 | 25.4000000 | AIR | |
| 6 | 71.59299716 | 1.6000000 | ACRYLIC | 1.49175 |
| 7 | 68.73995511 | 9.70000000 | AIR | |
| 8 | .00000000 | .000000000 | AIR | |
| 9 | .00000000 | 54.2000000 | AIR | |
| 10 | .00000000 | .00000000 | AIR | |
| 11 | .00000000 | 26.000000 | AIR | |
| 12 | .00000000 | .00000000 | AIR | |
| 13 | .00000000 | 28.200000 | AIR | |
| 14 | .00000000 | .00000000 | AIR | |
| 15 | .00000000 | 16.600000 | AIR | |
| 16 | .00000000 | .00000000 | AIR | |

ASPHERIC SURFACE COEFFICIENTS

| | COEFFICIENT | |
|---|---|---|
| SURFACE 6 | CC | −3.11933E + 00 |

LENS PARAMETERS

| EFL = | 166.6001 | F/NBR = | 16.37 |
|---|---|---|---|
| BF = | 16.6 | LENGTH = | 149.6 |
| OID = | 18454.2 | T-MAG = | −.009195 |

Figure 9:
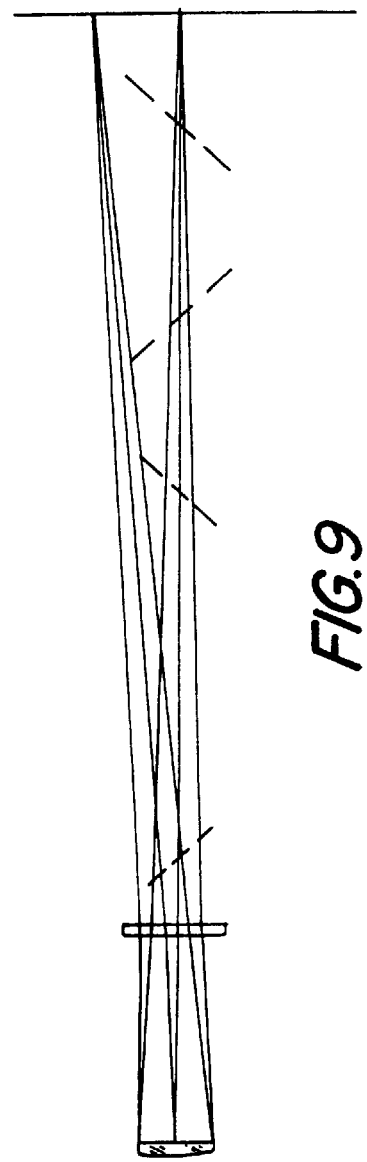
FIG. 9 is a lens construction diagram showing a 204 mm telephoto lens in its unfolded configuration.

Table 4 presents the constructional data for a 204 mm telephoto design that has an f/number of 19.54 and appears in FIG. 9 in its unfolded configuration. This is a two-element, all plastic design, with the first element of acrylic and the second of styrene for color correction purposes. Surface 6, the first surface of the last styrene element, is aspheric.

TABLE 4

TELEPHOTO 204 MM EFL, f/19.54 LENS

| Surface | Radius | Thickness | Medium | Index |
|---|---|---|---|---|
| 0 | .00000000 | 1.82880000E + 04 | AIR | |
| 1 | 101.34608728 | 2.50000000 | ACRYLIC | 1.49175 |
| 2 | −89.34608728 | 2.50000000 | AIR | |
| 3 | .00000000 | 4.94223396 | AIR | |
| 4 | .00000000 | 0.00000000 | AIR | |
| 5 | .00000000 | 25.4000000 | AIR | |
| 6 | 446.04631417 | 1.6000000 | STYRENE | 1.59048 |
| 7 | 62.25899234 | 9.70000000 | AIR | |
| 8 | .00000000 | .000000000 | AIR | |
| 9 | .00000000 | 54.2000000 | AIR | |
| 10 | .00000000 | .00000000 | AIR | |
| 11 | .00000000 | 26.000000 | AIR | |
| 12 | .00000000 | .00000000 | AIR | |
| 13 | .00000000 | 28.200000 | AIR | |
| 14 | .00000000 | .00000000 | AIR | |
| 15 | .00000000 | 16.600000 | AIR | |
| 16 | .00000000 | .00000000 | AIR | |

ASPHERIC SURFACE COEFFICIENTS

| | COEFFICIENT | |
|---|---|---|
| SURFACE 6 | CC | 1.17506E + 02 |

LENS PARAMETERS

| EFL = | 204.6647 | F/NBR = | 19.54 |
|---|---|---|---|
| BF = | 16.6 | LENGTH = | 152.5422 |
| OID = | 18457.1422 | T-MAG = | −.011351 |

Figure 10:
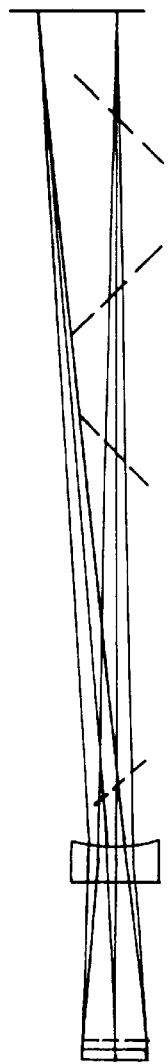
FIG. 10 is a lens construction diagram showing a 256 mm telephoto lens in its unfolded configuration.
Figure 11:
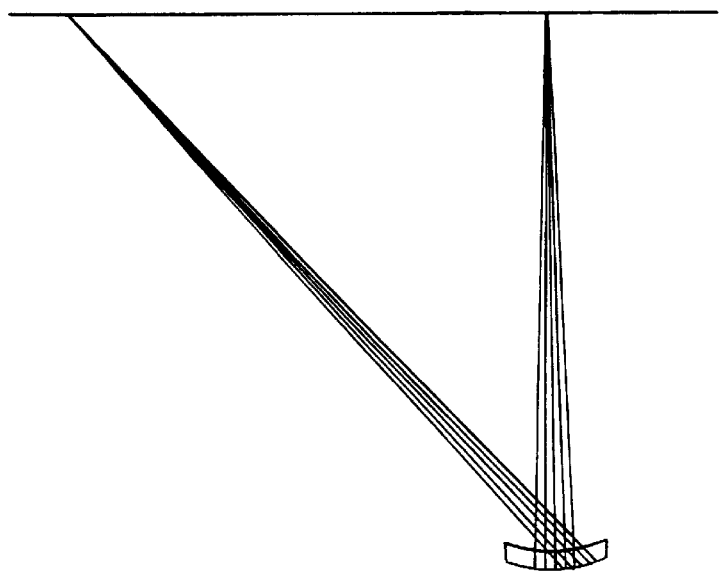
FIG. 11 is a lens construction diagram showing a 31.7 mm wide angle lens in its unfolded configuration.
Figure 12:
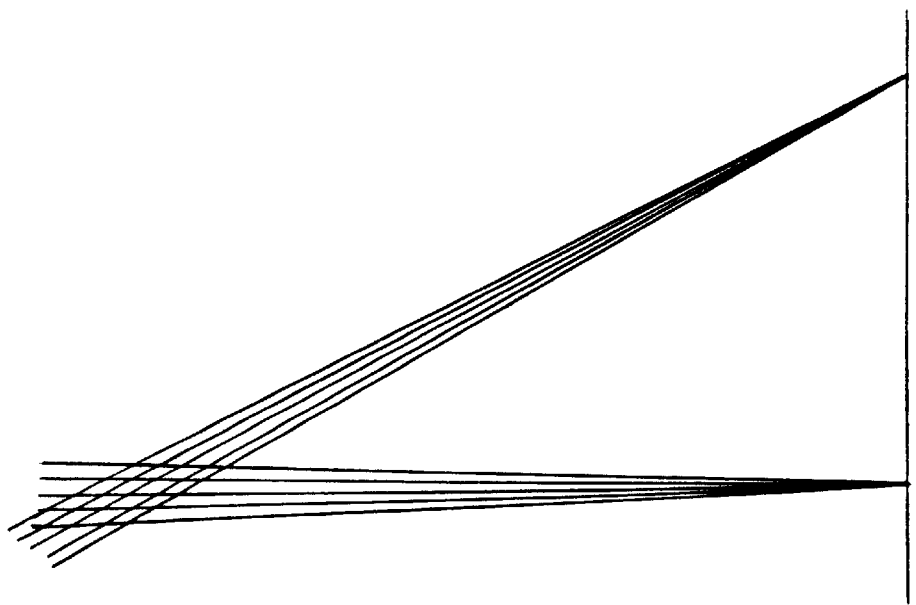
FIG. 12 is a lens construction diagram showing a 48.68 mm lens in its unfolded configuration.

Table 5 presents the constructional data for a two-element, all plastic telephoto design with an EFL of 256 mm and an f/number of 25.48. This design appears unfolded in FIG. 10. The first element of this design is of acrylic and the second of styrene, again for purposes of color correction. The first surfaces of both of its elements are aspheric and of pure conic form.

TABLE 5

TELEPHOTO 256 MM EFL, f/25.48 LENS

| Surface | Radius | Thickness | Medium | Index |
|---|---|---|---|---|
| 0 | .00000000 | 1.82880000E + 04 | AIR | |
| 1 | 63.03791292 | 2.50000000 | ACRYLIC | 1.49175 |
| 2 | −59.0610373 | .00000000 | AIR | |
| 3 | .00000000 | 1.02836767 | AIR | |
| 4 | .00000000 | 0.00000000 | AIR | |
| 5 | .00000000 | 25.4000000 | AIR | |
| 6 | −1007.38993765 | 5.70621486 | STYRENE | 1.59048 |
| 7 | 25.42267785 | 9.70000000 | AIR | |
| 8 | .00000000 | .000000000 | AIR | |
| 9 | .00000000 | 54.2000000 | AIR | |
| 10 | .00000000 | .00000000 | AIR | |
| 11 | .00000000 | 26.000000 | AIR | |
| 12 | .00000000 | .00000000 | AIR | |
| 13 | .00000000 | 28.200000 | AIR | |
| 14 | .00000000 | .00000000 | AIR | |
| 15 | .00000000 | 16.600000 | AIR | |
| 16 | .00000000 | .00000000 | AIR | |

ASPHERIC SURFACE COEFFICIENTS

| | COEFFICIENT | |
|---|---|---|
| SURFACE 1 | CC | −1.03319e + 01 |
| | AD | 00000E + 00 |
| | AE | 00000E + 00 |
| | AF | 00000E + 00 |
| | AG | 00000E + 00 |
| SURFACE 6 | CC | −1.92850E + 05 |

LENS PARAMETERS

| EFL = | 256.1995 | F/NBR = | 25.48 |
|---|---|---|---|
| BF = | 16.6 | LENGTH = | 152.7346 |
| OID = | 18457.3346 | T-MAG = | −.014357 |

Table 6 gives the constructional data for an acrylic, wide-angle, singlet with a 31.7 mm effective focal length and an f/number of 17.11.

TABLE 6

WIDE ANGLE 31.7 MM EFL, f/17.11 LENS

| Surface | Radius | Thickness | Medium | Index |
|---|---|---|---|---|
| 0 | .00000000 | 6.00000000E + 10 | AIR | |
| 1 | 0.0000000 | 0.00000000 | AIR | |
| 2 | 4.36669218 | .900000000 | ACRYLIC | 1.49175 |
| 3 | 5.65422512 | 1.00000000 | AIR | |
| 4 | .00000000 | 0.00000000 | AIR | |
| 5 | .00000000 | 25.50000000 | AIR | |
| 6 | .00000000 | 0.000000000 | AIR | |
| 7 | .00000000 | 16.600000000 | AIR | |

ASPHERIC SURFACE COEFFICIENTS

| | COEFFICIENT | |
|---|---|---|
| SURFACE 2 | CC | −8.74268E − 01 |
| | AD | −3.37205e − 04 |
| | AE | −3.23086e − 04 |

TABLE 6-continued

WIDE ANGLE 31.7 MM EFL, f/17.11 LENS

| Surface | Radius | Thickness | Medium | Index |
|---|---|---|---|---|
| | AF | 0.0000000 | | |
| | AG | 0.0000000 | | |

LENS PARAMETERS

| EFL = | 31.6933 | F/NBR = | 17.11 |
|---|---|---|---|
| BF = | .0000 | LENGTH = | 27.1971 |
| GIH | 21.0000 | | |

Table 7 provides the constructional data for a 48.685 mm, f/14.91 lens having a cylindrically curved focal plane.

TABLE 7

48.685 MM EFL, f/14.91 LENS

| Surface | Radius | Thickness | Medium | Index |
|---|---|---|---|---|
| 0 | .00000000 | 1.82880000E + 04 | AIR | |
| 1 | 0.0000000 | 0.00000000 | AIR | |
| 2 | 7.18536633 | 1.50000000 | ACRYLIC | 1.4917 |
| 3 | 9.56016936 | 305238533 | AIR | |
| 4 | .00000000 | 0.00000000 | AIR | |
| 5 | .00000000 | 40.0000000 | AIR | |
| 6 | .00000000 | 0.000000000 | AIR | |
| 7 | .00000000 | 16.600000000 | AIR | |

ASPHERIC SURFACE COEFFICIENTS

| | COEFFICIENT | |
|---|---|---|
| SURFACE 3 | CC | −1.12372E − 01 |
| | AD | 0.00000000 |
| | AE | 0.00000000 |
| | AF | 0.00000000 |
| | AG | 0.00000000 |

LENS PARAMETERS

| EFL = | 48.6854 | F/NBR = | 14.91 |
|---|---|---|---|
| BF = | 0.00000 | LENGTH = | 45.0824 |
| GIH | 21.0000 | | |

As mentioned previously, this invention is intended to fulfill an identifiable need for a compact, low cost, dual focal length camera to be used in conjunction with binoculars of modest power at sporting, entertainment or other events for taking close up photographs whose appearance is comparable to that of distant scenes as observed through binoculars having a magnification in the range including 5×–8×.

In binocular jargon, one specifies the width of the field covered at a distance of 1000 yards. To achieve field coverage comparable to 5×–8× binoculars at 1000 yards requires a telephoto lens whose focal length is somewhere between 140 to 240 mm, which is substantially longer than the normal 30–40 mm wide angle typically provided in such dual focal length cameras. With pictures taken with a lens with a focal length between about 140 and 200 mm, the visual impression of the scale of subjects in the picture approximates the same scale those objects appear to have when observing them through binoculars.

To satisfy the foregoing requirements demanding that the telephoto pictures mimic the binocular view obviously requires telephoto focal lengths comparable to those described above while still having a compact camera. During the design of camera 10 a useful design rule emerged that satisfies all of the requirements for space and optical performance. Referring now to FIG. 4, it can be shown that the size of the camera and the optical path length available for the telephoto design are related to the height of the film format and the focal length of the wide angle or primary lens focal length as follows:

$$TFPL\text{(telephoto path length)} = 2(H_f + EFF_{wa}),$$

where $H_f$ is the height of the film format and $EFF_{wa}$ is the effective focal length of the wide angle design.

The foregoing relationship for the TFPL is an expression that depends on film format height and wide angle focal length assumes that the space needed for fitting the four mirror system around the film plane of the preferred embodiment of FIGS. 1 through 4 can be expressed as percentage of the film height, and has been approximated to be 15% of $H_f$. This approximation, of course, can be sensibly altered if needs dictate, and such an alteration will slightly alter the above relationship, but not dramatically.

Once the film height is determined and the choice of primary focal length is made, it can be seen that the vertical section of the camera, which is its profile at least in the plane containing the optical axes of the primary and secondary lenses, is set as is the optical path into which the telephoto design must be fit. Depending on the telephoto to wide angle ratio, these determinations will in turn set the back focal distance available for the telephoto or longer focal length system, and this, in turn, dictates whether a traditional telephoto design will be required where the effective focal length is longer than the back focal length.

To take some examples of how this works, assume that 35 mm film is to be used having a film height of 35 mm (including sprocket holes), and one desires a primary taking lens with an effective focal length of 28 mm. Under these conditions, the TFPL is 126 mm. Therefore, if one wants a focal length longer that the available 126 mm physical distance, a telephoto design must be employed. For the above conditions then, if a range of medium telephoto designs from, say 120 to 240 mm, is desired, all focal length designs in excess of 126 mm would have to be traditional telephoto designs.

If one increases the focal length of the wide angle design to, say 38 mm, then the physical space for the longer focal length lens becomes 146 mm, and for a primary lens design with an EFF of 50 mm, the longer focal length lens can fit into 170 mm of physical path length.

It should be clear from the foregoing that the film format vertical size, or the size of any other photodetector used, and the effective focal length of the primary, direct or unfolded path of focal length, determine the camera or imaging system profile size and the space available for the longer focal length design. Moreover, it should also be apparent the minimum telephoto to wide angle ratio is also dependent on the foregoing relationship. For 35 mm film with a normal lens of 50 mm, the physical path length available for the longer of the focal length lenses for the four mirror camera design is 170 mm where the telephoto to wide angle ratio is 3.4. Thus, this camera design permits minimum telephoto to wide angle ratios of 3.4:1 while still remaining compact and ergonomically sound. While ratios of 3.4:1 represent the bottom end of the range, it is clear that as the wide angle lens focal length becomes smaller, say approaching 28 mm, and the longer focal length becomes larger, say approaching 240 mm, the ratio approaches 8.56, and ratios within this range may be achieved with relatively simple telephoto designs, some of which have been described previously.

Figure 14:
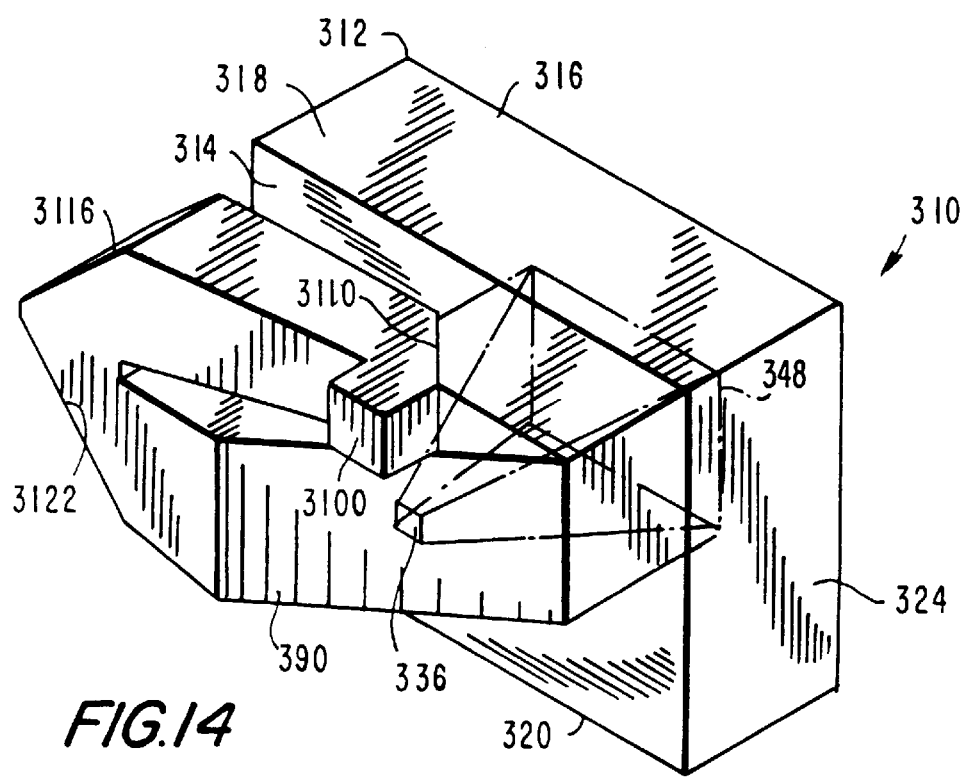
FIG. 14 is a diagrammatic isometric drawing of a second alternative preferred embodiment of the inventive, compact, dual focal length camera showing selected components of its wide angle and telephoto optical systems.
Figure 13A:
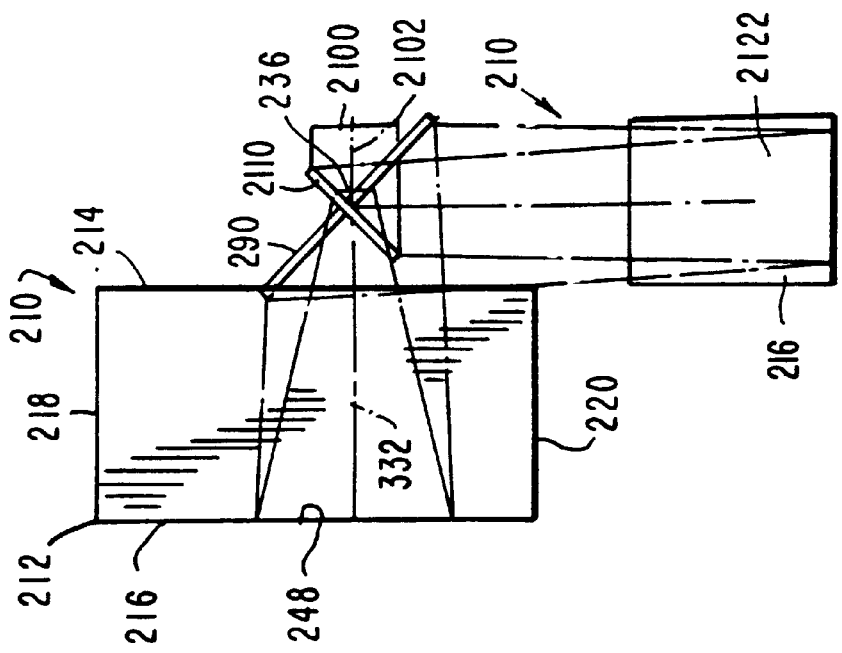
FIG. 13a is a diagrammatic side-elevational view of the camera shown in FIG. 13.
Figure 13:
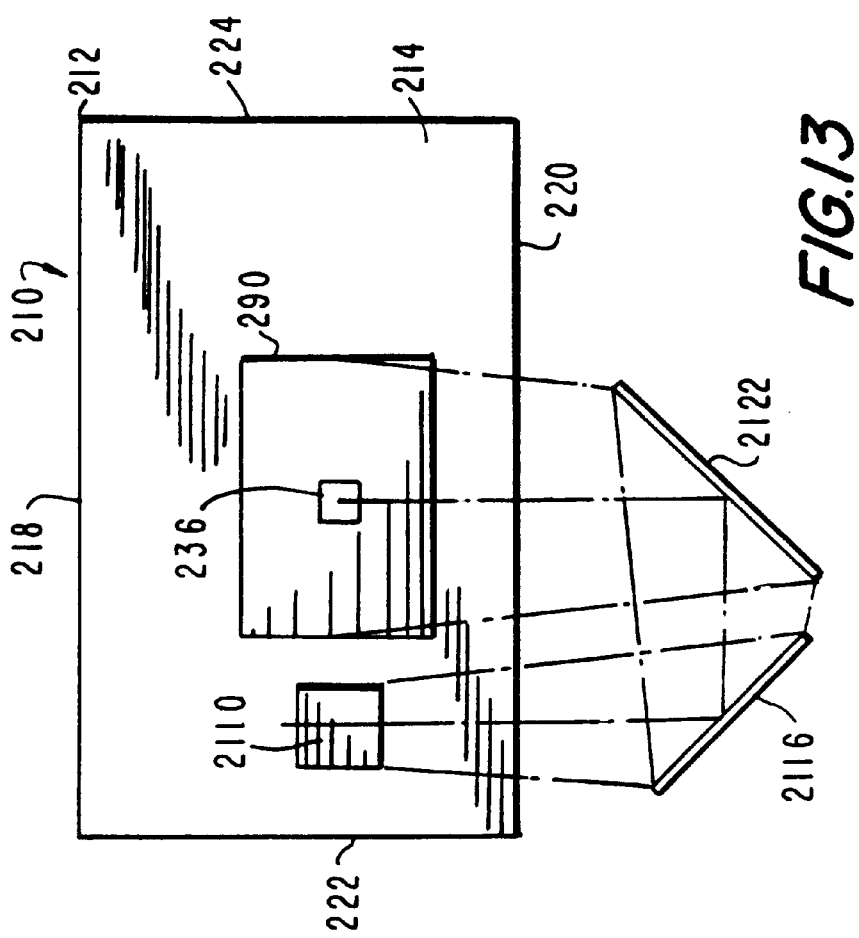
FIG. 13 is a diagrammatic front-elevational view of a first alternative preferred embodiment of the inventive, compact, dual focal length camera showing selected components of its wide angle and telephoto optical systems.

FIGS. 13, 14 and 15 show cameras 210, 310 and 410, which are respectively first second and third alternative preferred embodiments of the present invention. While the previously described camera 10 includes a four mirror folded optical path for the telephoto optical system which has a portion thereof that wraps around the film plane 48 so that two mirrors 110 and 116 and the principal optical path segment 114 therebetween are all behind or to the rear of the film plane 48, these three alternative preferred embodiment cameras 210, 310 and 410 differ from camera 10 in that they have all the wide angle and telephoto lens elements, the four mirrors in the telephoto optical system and the corresponding principal optical path segments therebetween, in front of the film plane 48. These three cameras retain the desired compactness characteristic but have external camera shapes with differ from camera 10, and each other, as will become apparent, because they each employ different four mirror optical path folding configurations.

Where practical, camera components that are similar to those in camera 10 and have essentially the same function will be numbered the same in the drawings but will include a prefix digit of 2, 3 or 4, respectively for the alternative preferred embodiment cameras 210, 310 and 410. For example, the camera 10 primary or wide angle taking lens 36 shall be designated 236 for camera 210, 336 for camera 310 and 436 for camera 410.

As shown in FIGS. 13 and 13a, camera 210 includes a box like camera housing 212 having a forward wall 214 and opposed rear or back wall 216 having structure on the interior surface thereof defining a film plane 248. Projecting forwardly of wall 214 in a lens housing (not shown) is a wide angle, or primary, taking lens 236 positioned with its optic axis 352 normal or perpendicular to the film plane 248 for focusing an image of an object or subject on a segment of photographic film strip located at film plane 248.

Also projecting forwardly of forward housing wall 214 and downwardly below housing bottom wall 220 is a telephoto optical system, enclosed in a housing (not shown), including a medium telephoto lens 2100 and four mirrors 2110, 2116 2122 and 290 for defining a compact folded optical path between lens 2100 and the film plan 248. As in the previously described camera 10, the first three mirrors 2110, 2116 and 2122 are fixed in their illustrated positions, but the fourth mirror 290 is mounted for movement between a first position (not shown) where it has been pivoted counter-clockwise, as viewed in FIG. 13a, about it forward lower edge out of the field of wide angle lens 236 in which it permits scene light emerging from the wide angle lens system to impinge on film plane 248 while preventing scene light from emerging from said telephoto lens system from impinging on the film plane 248 and a second position, best shown in FIG. 13a, in which it prevents scene light emerging from the wide angle optical system from impinging on said film plane 248 while directing scene light emerging from said telephoto optical system onto film plane 248. Camera 210 differs from camera 10 in that it has all of its wide angle and telephoto lens elements and the four mirrors in the telephoto optical system along with the corresponding principal optical path segments therebetween in front of the film plane 248. In this embodiment, the wide angle lens 236 and the medium telephoto lens 2100 are mounted such that their respective optical axes are parallel to each other and are normal or orthogonal to the film plane 248.

With reference to FIG. 14, camera 310 is similar to camera 210 in most respects, but it has its telephoto optical system rotated 90° in a counter-clockwise direction with respect to the telephoto system of camera 210 when looking at the front elevational view of these two camera in FIGS. 13 and 14a. The advantage of this configuration is that the height of the camera 310 does not have to be increased to accommodate the medium telephoto optical system.

As shown in FIGS. 14, 14a 14b and 14c, camera 310 includes a box like camera housing 312 having a forward wall 314 and opposed rear or back wall 316 having structure on the interior surface thereof defining a film plane 348. Projecting forwardly of wall 314 in a lens housing (not shown) is a wide angle, or primary, taking lens 336 positioned with its optic axis 352 normal or perpendicular to the film plane 348 for focusing an image of an object or subject on a segment of photographic film strip location at film plane 348.

Also projecting forwardly of forward housing wall 314 and laterally beyond housing side wall 322 is a telephoto optical system, enclosed in a housing (not shown), including a medium telephoto lens 3100 and four mirrors 3110, 3116, 3122 and 390 for defining a compact folded optical path between lens 3100 and the film plan 348. As in the previously described camera 10, the first three mirrors 3110, 3116 and 3122 are fixed in their illustrated positions, but the fourth mirror 390 is mounted for movement between its first position (not shown) where it has been pivoted counterclockwise about its forward lower edge, out of the field of wide angle lens 336, in which it permits scene light emerging from the wide angle lens system to impinge on said film plane 348 while preventing scene light from emerging from said telephoto lens system from impinging on the film plane 348 and second position, best shown in FIG. 14c, in which it prevents scene light emerging from the wide angle optical system from impinging on said film plane 348 while directing scene light emerging from said telephoto optical system onto film plane 348.

Camera 310 differs from camera 10 in that it has all of its wide angle and telephoto lens elements and the four mirrors in the telephoto optical system, along with the corresponding principal optical path segments therebetween, in front of the film plane 348. In this embodiment, the wide angle lens 336 and the medium telephoto lens 3100 are mounted such that their respective optical axes are parallel to each other and are normal or orthogonal to the film plane 348.

With reference to FIGS. 15, 15a and 15b, a camera 410 has all of its wide angle and telephoto lens elements and the four mirrors in the telephoto optical system, and the corresponding principal optical path segments therebetween, in front of the film plane just like configurations of camera 210 and 310, but it differs significantly from the optical configurations of camera 10, 210 and 310 in that its medium telephoto lens 4100 is mounted so that its optical axis 4108 is orthogonal to the optical axis 452 of the wide angle lens 436 and parallel to the film exposure plane 448.

Camera 410 includes a box like camera housing 412 having a forward wall 414 and opposed rear or back wall 416 having structure on the interior surface thereof defining a film plane 448. Projecting forwardly of wall 414 in a lens housing (not shown) is a wide angle, or primary, taking lens 436 positioned with its optical axis 452 normal or perpendicular to the film plane 448 for focusing an image of an object or subject on a segment of photographic film strip location at film plane 448.

Projecting upwardly from housing top wall 418 is a housing (not shown) enclosing the medium telephoto lens 4100 and the first two mirrors 4110 and 4116 of the camera's four mirrors in the camera's four mirror telephoto system. The first mirror 4110 extends upwardly from top wall 418 with its leading edge near forward wall 414 and is angled with respect to the optical axis 4108 of telephoto lens 4100 to reflect image bearing light rearwardly to the second mirror 4116. Mirror 4116 extends upwardly from top wall 418 and is angled to reflect light from mirror 4110 forwardly, parallel to top wall 418, past housing forward wall 414 into a mirror housing (not shown) projecting forwardly of housing wall 414 and mounting the third and fourth mirrors 4122 and 490 therein. Mirror 4122 is angled downwardly at 45° and folds the light from mirror 4116 through 90° to mirror 490 which is mounted at an angle of 45° with respect to housing wall 414 to fold the light from mirror 4122 through 90° readwardly to the film plane 448 to expose a segment of a film strip located there. As in the previously described camera 10, the first three mirrors 4110, 4116 and 4122 are fixed in their illustrated positions, but the fourth mirror 490 is mounted for movement between its first position (not shown) where it has been pivoted clockwise about it forward upper edge, out of the field of wide angle lens 436, in which it permits scene light emerging from the wide angle lens system to impinge on the film plane 448, while preventing scene light from emerging from the telephoto lens system from impinging on the film plane 448 and a second position, best shown in FIG. 15a, in which it prevents scene light emerging from the wide angle optical system from impinging on said film plane 448, while directing scene light emerging from said telephoto optical system onto film plane 448.

In another comparison of the four different preferred embodiments of the compact, dual focal length cameras disclose herein, it will be apparent to one skilled in the art that due to the various arrangements of the four mirrors in the telephoto systems, cameras 210, 310 and 410 will produce telephoto images on the film that are rotated (upside down and backward) relative to the wide angle images. Thus, when a camera user receives prints from these cameras 210, 310, and 410, he or she will be able to readily separate the telephoto from the wide angle photographs based on whether he or she has to rotate to the proper orientation for viewing.

Figure 16:
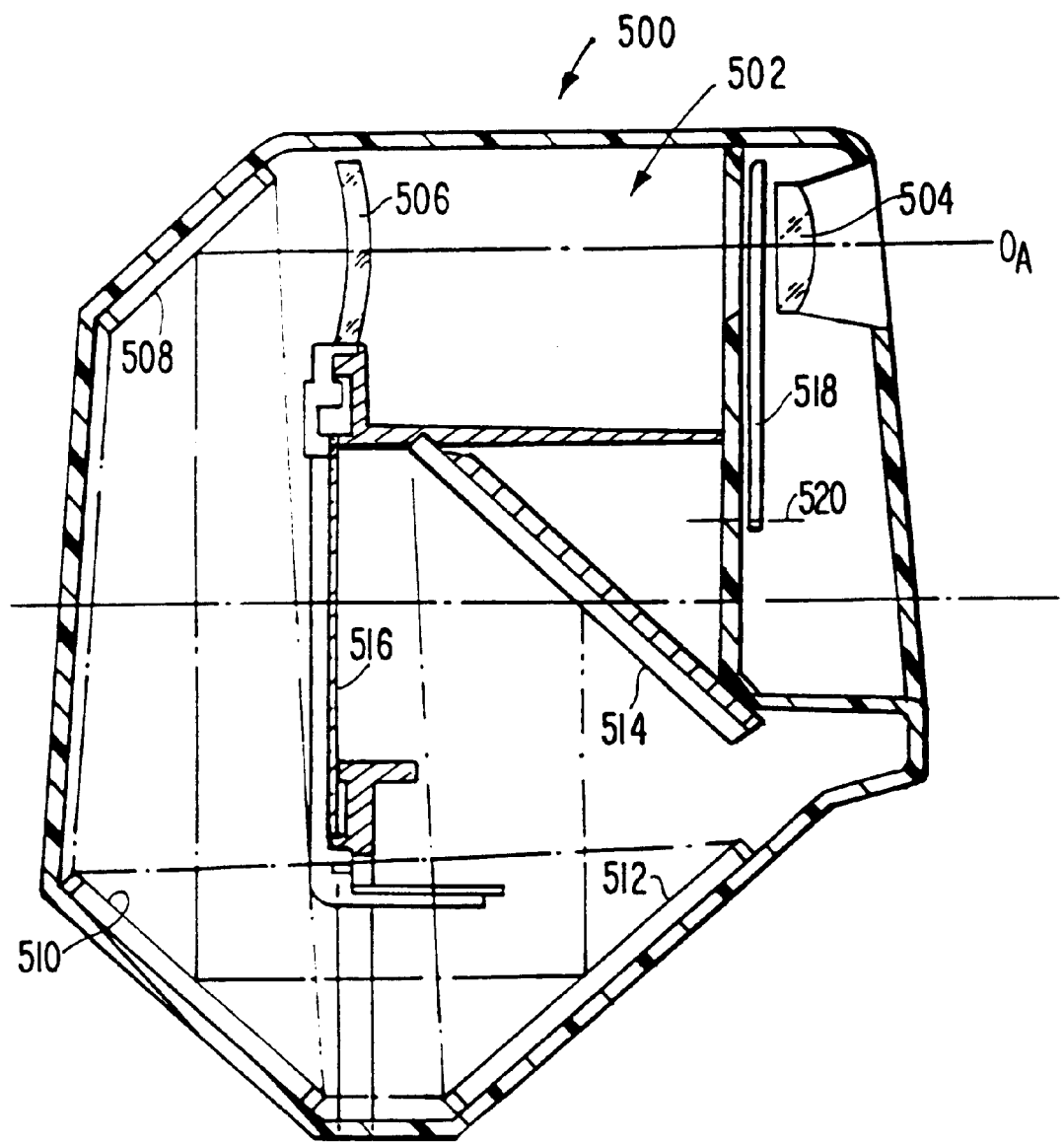
FIG. 16 is a diagrammatic elevational sectional view showing an alternative embodiment of the invention.

Another embodiment of the present invention that is not a dual focal length camera is shown in FIG. 16. Here, a telephoto camera, that is suitable as a single-use camera, is shown designated at 500. Camera 500 is similar in many ways to the dual focal length camera of FIGS. 3 and 4, but is much less complex because it has only one objective taking lens system, and therefore, does not require a moveable mirror or twin viewfinders as were needed with the previously described dual focal length cameras in converting between their wide angle to telephoto modes of operation As seen in FIG. 16, camera 500 comprises a telephoto objective taking lens system 502 of two-element design having a first lens 504 followed by a second lens 506. Lens 504 and 506 may possess the constructional features of similar telephoto systems previously described in the above tables relating to telephoto designs.

Following lens 506 are four mirrors, 508, 510, 512, and 514 for folding the telephoto taking path four times, as before, to direct image bearing rays to the film plane designated here as 516.

A shutter shown at 518 pivots about a point of rotation 520 to provide exposure control in a as before or in well-known manners suitable for single taking lens cameras.

Camera 500 with its telephoto optical path wrapped around film plane 516 thus represents a compact camera capable of taking telephoto pictures with lens focal lengths in the middle of the telephoto range. As such, it is an attractive companion for use with low-cost binoculars in taking photographs that mimic what users see in the binoculars, but without the complexity and cost associated with the dual focal length versions previously described.

As will be readily apparent, the non-dual focal length telephoto camera described above may also have the folded optical path configurations described in connection with FIGS. 13 through 15 with the wide angle lens removed.

Other variations of the invention will be obvious to those skilled in the art who may make changes without departing from the scope of its teachings. It will be readily apparent, for example, that where film is the photodetector, the film plane may be curved in one azimuth and popular film formats other than the 35 mm and APS formats may be used. Where formats other than 35 mm are to used, the focal lengths may be scaled to appropriate wide angle and telephoto values. In addition, more complex optical systems may be used for both wide angle and telephoto systems. For example, the wide angle systems could easily be of two or more element construction. In the case where a curved film plane is used, it preferably has a cylindrical radius of 200 mm. Therefore, it is intended that the embodiments shown herein be considered illustrative and not in a limiting sense.

What is claimed is:

1. A compact camera with telephoto lens and folded optical path comprising:

a compact housing having an aperture in a wall of thereof;

a telephoto lens mounted in optical registration with said aperture;

a image medium support for positioning an image receiving surface of an image recording medium; and a plurality of reflecting surfaces for providing a folded optical path between said telephoto lens and said image receiving surface, said optical path having an optical axis which is in a plane perpendicular to the center of said image medium support, said plurality of reflecting surfaces comprising a first rear reflecting surface and a second rear reflecting surface arranged with respect to each other so that a portion of said axis of the optical path between them passes behind the center of said image support medium.

2. The camera of claim 1 wherein said plurality of reflecting surfaces further comprises a first front reflecting surface and a second front reflecting surface, wherein a portion of said optical path passes between one of said front reflecting surfaces and one of said rear reflecting surfaces above said image support medium, and another portion of said optical path passes between the other of said front reflecting surfaces and the other of said rear reflecting surfaces below said image support medium.

3. The camera of claim 1 wherein said reflecting surfaces comprise four front-surface mirrors, each mounted at 90 degrees to an adjacent one of said mirrors along said optical path.

4. The camera of claim 1 further comprising a second lens having a shorter focal length than said telephoto lens and the optical axis of said second lens being in said plane perpendicular to the center of said image medium support; and one of said reflecting surfaces being moveably mounted between said second lens and said image medium support, said moveably mounted reflecting surface having a first stable position in which it blocks the optical path from said telephoto lens toward said image medium support and does not block the optical path from said second lens toward said image medium support, and a second stable position in which it blocks the optical path from said second lens toward said image medium support and comprises one of the reflecting surfaces forming the optical path from said telephoto lens toward said image medium support.

5. The camera of claim 1 wherein said image medium support is generally rectangular and wherein said compact housing further comprises:

a main housing section including a film supply compartment at one side of said image medium support and a film takeup compartment at the opposite side of said image medium support; and an optical passage housing section protruding from said main housing section to another side of said image medium support and containing at least two of said reflecting surfaces.

* * * * *